United States Patent
Chen

(10) Patent No.: US 12,536,618 B2
(45) Date of Patent: Jan. 27, 2026

(54) ARTIFICIAL-INTELLIGENCE-BASED IMAGE PROCESSING METHOD AND APPARATUS, ELECTRONIC DEVICE, COMPUTER-READABLE STORAGE MEDIUM, AND COMPUTER PROGRAM PRODUCT

(71) Applicant: TENCENT TECHNOLOGY (SHENZHEN) COMPANY LIMITED, Shenzhen (CN)

(72) Inventor: Fasheng Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 581 days.

(21) Appl. No.: 17/986,415

(22) Filed: Nov. 14, 2022

(65) Prior Publication Data

US 2023/0074060 A1 Mar. 9, 2023

Related U.S. Application Data

(63) Continuation of application No. PCT/CN2022/080824, filed on Mar. 15, 2022.

(30) Foreign Application Priority Data

Apr. 15, 2021 (CN) .......................... 202110407801.X

(51) Int. Cl.
*G06T 5/50* (2006.01)
*G06T 7/90* (2017.01)

(52) U.S. Cl.
CPC .................. *G06T 5/50* (2013.01); *G06T 7/90* (2017.01); *G06T 2207/10024* (2013.01); *G06T 2207/20212* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 5,355,174 A | 10/1994 | Mishima | |
| 6,311,204 B1 * | 10/2001 | Mills | H04N 21/64307 345/558 |

(Continued)

FOREIGN PATENT DOCUMENTS

| | | |
|---|---|---|
| CN | 103581571 A | 2/2014 |
| CN | 103618886 A | 3/2014 |

(Continued)

OTHER PUBLICATIONS

The European Patent Office (EPO) The Extended European Search Report for 22787312.2 Jun. 14, 2024 11 Pages.

(Continued)

*Primary Examiner* — Samah A Beg
(74) *Attorney, Agent, or Firm* — Anova Law Group, PLLC

(57) ABSTRACT

This application provides an artificial-intelligence-based image processing method and apparatus, an electronic device, a computer-readable storage medium, and a computer program product. The method includes determining a background color in an image to be processed; determining a blending transparency of the pixel according to a chroma difference between a pixel and the background color in the image to be processed; obtaining a background image corresponding to the image to be processed; and performing in pixels an image blending process on the image to be processed and the background image according to the blending transparency of the pixel to obtain a composite image.

20 Claims, 10 Drawing Sheets

(56) References Cited

U.S. PATENT DOCUMENTS

| | | | | |
|---|---|---|---|---|
| 8,081,821 | B1* | 12/2011 | Schaem | H04N 9/75 382/173 |
| 11,763,519 | B2* | 9/2023 | Aoki | G09G 5/14 345/611 |
| 2003/0086018 | A1* | 5/2003 | Berman | H04N 9/75 348/584 |
| 2006/0033824 | A1 | 2/2006 | Nicholson | |
| 2010/0277471 | A1 | 11/2010 | Beato et al. | |
| 2019/0272663 | A1* | 9/2019 | Bar-Zeev | G06T 15/50 |
| 2025/0095283 | A1* | 3/2025 | Pinhasov | H04N 5/265 |

FOREIGN PATENT DOCUMENTS

| | | | | |
|---|---|---|---|---|
| CN | 103679658 A | | 3/2014 | |
| CN | 107635103 A | | 1/2018 | |
| CN | 112330531 A | * | 2/2021 | G06T 3/04 |
| CN | 113724175 A | | 11/2021 | |

OTHER PUBLICATIONS

The World Intellectual Property Organization (WIPO) International Search Report for PCT/CN2022/080824 May 25, 2022 7 Pages (including translation).

* cited by examiner

ARTIFICIAL-INTELLIGENCE-BASED IMAGE PROCESSING METHOD AND APPARATUS, ELECTRONIC DEVICE, COMPUTER-READABLE STORAGE MEDIUM, AND COMPUTER PROGRAM PRODUCT

RELATED APPLICATIONS

Embodiments of this application is a continuation of PCT Application No. PCT/CN2022/080824, filed on Mar. 15, 2022, which in turn claims priority to Chinese Patent Application No. 202110407801.X filed on Apr. 15, 2021. The two applications are both incorporated by reference in their entirety.

FIELD OF THE TECHNOLOGY

This application relates to artificial intelligence technologies, and particularly to an artificial-intelligence-based image processing method and apparatus, an electronic device, a computer-readable storage medium, and a computer program product.

BACKGROUND OF THE DISCLOSURE

With the rapid development of computer technology and image technology, image keying has been widely used in various use scenarios such as film production. Image keying refers to keying a certain color in an image to be processed and overlaying a specific background image over the image to be processed, to implement overlaying synthesis of a two-layer picture. For example, after a person is photographed indoors to obtain an image to be processed, an indoor background in the image may be keyed by an image keying technology, and the person in the image to be processed may be overlaid with a specific background.

A user usually sets a background color to be keyed and a corresponding tolerance range to control a keying range based on the set tolerance range, to implement image keying. However, this solution may result in the loss of edge details (for example, hair details of a person) during image keying, namely the image processing accuracy is low.

SUMMARY

Embodiments of this application provide an artificial-intelligence-based image processing method and apparatus, an electronic device, a computer-readable storage medium, and a computer program product. Original edge details in an image to be processed may be retained during image processing, and the quality and accuracy of an obtained composite image may be improved.

The technical solutions of the embodiments of this application are implemented as follows:

The embodiments of this application provide an artificial-intelligence-based image processing method. The method includes determining a background color in an image to be processed; determining a blending transparency of the pixel according to a chroma difference between a pixel and the background color in the image to be processed; obtaining a background image corresponding to the image to be processed; and performing in pixels an image blending process on the image to be processed and the background image according to the blending transparency of the pixel to obtain a composite image.

The embodiments of this application provide an electronic device, including a memory, configured to store executable instructions; and a processor, configured to implement, when executing the executable instructions stored in the memory, the artificial-intelligence-based image processing method provided in the embodiments of this application.

An embodiment of this application provides a non-transitory computer-readable storage medium, storing executable instructions, the executable instructions, when executed by a processor, causing the processor to implement the artificial-intelligence-based image processing method provided in the embodiments of this application.

In embodiments of the present disclosure, a blending transparency of a pixel in an image to be processed is determined according to a chroma difference between the pixel and a background color, and an image blending process is performed in pixels on the image to be processed and a background image according to the blending transparency of the pixel. Compared with keying according to a tolerance range, smoother image blending in the embodiments of this application may retain original edge details in the image to be processed while improving the image quality and accuracy in the obtained composite image.

DESCRIPTION OF EMBODIMENTS

Figure 1:
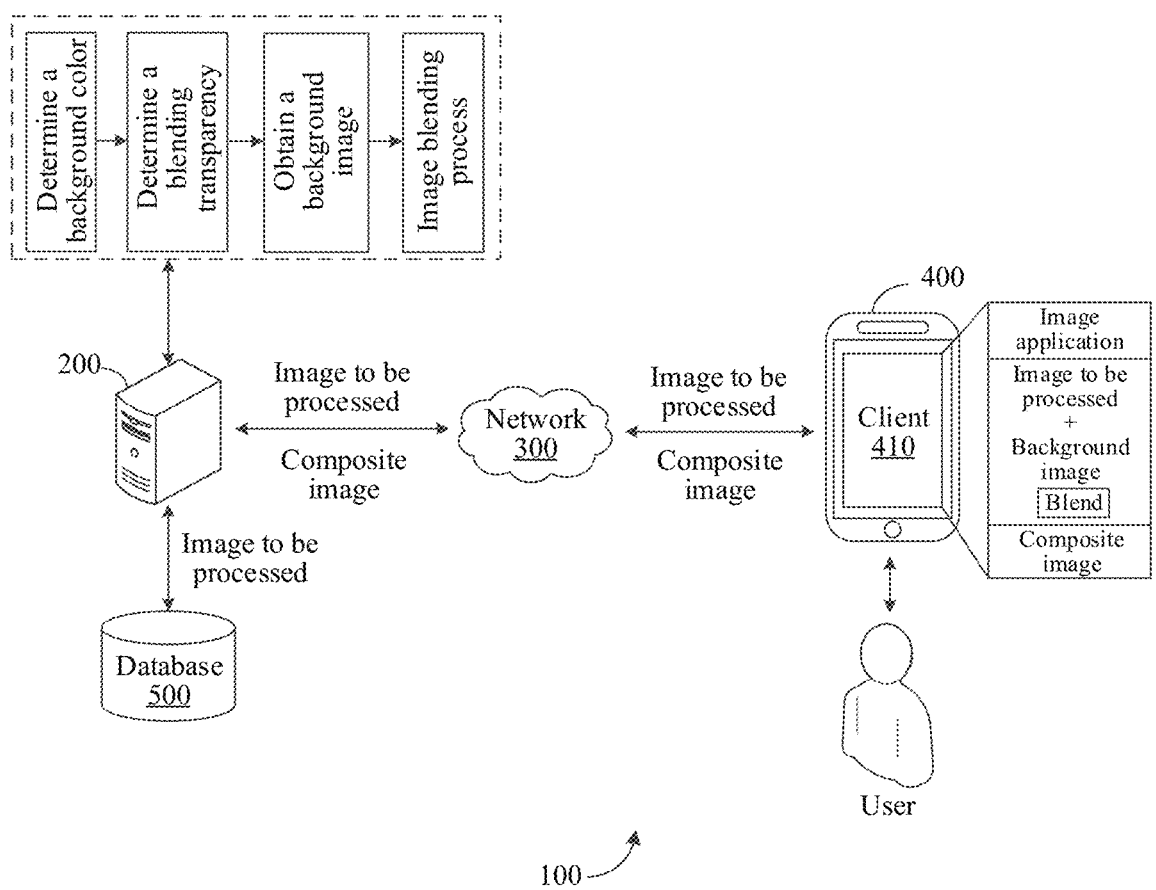
FIG. 1 is a schematic architectural diagram of an artificial-intelligence-based image processing system according to an embodiment of this application.

To make the objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following descriptions, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein. In the following description, the term "plurality of" means at least two.

Unless otherwise defined, meanings of all technical and scientific terms used in this specification are the same as those usually understood by a person skilled in the art to which this application belongs. Terms used in this specification are merely intended to describe objectives of the embodiments of this application, but are not intended to limit this application.

Before the embodiments of this application are further described in detail, terms involved in the embodiments of this application are described. The terms provided in the embodiments of this application are applicable to the following explanations.

1) Artificial Intelligence (AI) is a theory, method, technology, and application system that uses a digital computer, or a machine controlled by the digital computer to simulate, extend, and expand human intelligence, perceive an environment, obtain knowledge, and use knowledge to obtain an optimal result. Computer vision (CV) is an important application of artificial intelligence, which uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. In embodiments of this application, image processing may be implemented based on a computer vision technology.

2) Background color: it refers to a color to be keyed/overlaid in an image to be processed. In the embodiments of this application, the background color may be specified by a user or intelligently recognized from the image to be processed.

3) Chroma: three elements of a color may include hue (tone), saturation (purity), and luminance. A color is a sensation produced by physical light on an object reflected onto the human optic nerve, and differences of colors are determined by differences of light frequencies. The hue is used to reflect situations of the colors of different frequencies. The saturation is used to indicate how bright or brilliant the color is. The luminance is used to indicate how bright or dark the color is. In the embodiments of this application, chroma denotes a property of a color different from luminance. For example, chroma may include at least one of a hue and a saturation.

4) Pixel: it refers to an element that cannot be further divided in an image.

5) Color space: also referred to as color gamut and color space, it refers to an abstract model that describes a color with a set of values. The described color is objective, and different color spaces describe the color only from different angles. The color space includes multiple channels, and may describe the color with channel values corresponding to the respective channels.

The color space may be divided into two types according to the basic structure: a primary color space and a chroma-luminance separated color space. An example of the former is a red green blue (RGB) color space, including a red channel, a green channel, and a blue channel. That is, the primary color space does not explicitly distinguish luminance from chroma. A YUV color space, an HSV color space, an HSL color space, and a LAB color space are all examples of the latter. The chroma-luminance separated color space explicitly distinguishes luminance from chroma. Channel Y in the YUV color space corresponds to luminance, and both channels U and V correspond to chroma. Channels H, S, and V in the HSV color space correspond to hue, saturation, and luminance respectively. Channels H, S, and L in the HSL color space correspond to hue, saturation, and luminance respectively. Channels L, A, and B in the LAB color space all correspond to chroma.

6) Table lookup acceleration: it is an acceleration method of exchanging space (storage space) for time (runtime), which may be used to accelerate image processing in the embodiments of this application, to improve the image processing efficiency while reducing the real-time computing load. For example, various results that may be involved in image processing may be computed in advance and stored in a particular data structure (for example, a table), such that the data structure is directly queried in real-time image processing without real-time computation.

For image keying, a super key algorithm (for example, a super-key algorithm in Premiere) is often used. In the super key algorithm, a user needs to set a background color (for example, green or blue) to be keyed and a corresponding tolerance range, the set tolerance range being used for controlling a keying range. In addition, the user may also perform various operations, such as feathering and shrinking. However, there are at least the following problems during image keying with the super key algorithm. 1) In the process of image keying, original edge details (for example, hair details of a person) in an image to be processed may be lost, resulting in poor keying effects. 2) Highlight and shadow effects in an image finally obtained by overlaying are relatively poor, for example: shadows are gray, and the original shadow effects in the image to be processed may not be simulated effectively. 3) A semitransparent object (for example, a glass) in the image to be processed may not be processed accurately, and the semitransparent object in the image finally obtained by overlaying may have the problems of distortion, blurring, etc. 4) A foreground (or referred to as target) in the image finally obtained by overlaying may be biased to a background color, for example: when a background color is green, the person (i.e., foreground) in the image finally obtained by overlaying may be greenish. 5) The user needs to perform too many operations, and the learning difficulty and the learning cost of the user are relatively high for the user.

The embodiments of this application provide an artificial-intelligence-based image processing method and apparatus, an electronic device, a computer-readable storage medium, and a computer program product. Edge details in an image to be processed may be retained during image processing, and the quality and accuracy of an obtained composite image may be improved. An application of the electronic device provided in the embodiments of this application will be described below. The electronic device provided in the embodiments of this application may be implemented as various types of terminal devices, or may be implemented as a server.

FIG. 1 is a schematic architectural diagram of an artificial-intelligence-based image processing system 100 according to an embodiment of this application. A terminal device 400 is connected with a server 200 through a network 300. The server 200 is connected with a database 500. The network 300 may be a wide area network, or a local area network, or a combination thereof.

In some embodiments, the artificial-intelligence-based image processing method provided in the embodiments of this application may be implemented by the terminal device. For example, the terminal device 400 obtains an image to be processed. The image to be processed may be stored locally in the terminal device 400 in advance, or shot by the terminal device 400 in real time, or obtained by the terminal device 400 from the outside (for example, the server 200, the database 500, and a blockchain). For the obtained image to be processed, the terminal device 400 determines a background color in the image to be processed. For example, the terminal device 400 may obtain the background color set by a user through a background color setting operation in response to the background color setting operation. In another example, the terminal device 400 may perform intelligent recognition on the image to be processed to automatically recognize the background color. Then, the terminal device 400 determines, according to a chroma difference between a pixel in the image to be processed and the background color, a blending transparency of the pixel, and perform in pixels an image blending process on the image to be processed and an obtained background image according to the blending transparency to obtain a composite image. Similarly, the background image may be stored in advance, shot in real time, or obtained from the outside by the terminal device 400.

In some embodiments, the artificial-intelligence-based image processing method provided in the embodiments of this application may be implemented by the server. For example, the server 200 (for example, a backend server of an image application) may obtain an image to be processed from the database 500. Certainly, the image to be processed may also be obtained by the server 200 from another position (for example, the terminal device 400 and a blockchain). For the obtained image to be processed, the server 200 determines a background color in the image to be processed. For example, the server 200 may receive the background color set by a user from the terminal device 400. In another example, the server 200 may perform intelligent recognition on the image to be processed to automatically recognize the background color. Then, the server 200 determines, according to a chroma difference between a pixel in the image to be processed and the background color, a blending transparency of the pixel, and perform in pixels an image blending process on the image to be processed and an obtained background image according to the blending transparency to obtain a composite image. Similarly, the background image may be obtained by the server 200 from the database 500 or another position.

In some embodiments, the artificial-intelligence-based image processing method provided in the embodiments of this application may be implemented collaboratively by the terminal device and the server. As shown in FIG. 1, the terminal device 400 transmits an image to be processed, a background color, and a background image to the server 200 in response to a user operation, and the server 200 performs image processing. After obtaining a composite image by image processing, the server 200 transmits the composite image to the terminal device 400.

In some embodiments, various results involved in image processing (for example, an image to be processed, a background color, a background image, a composite image, and various tables for table lookup acceleration) may be stored in a blockchain. Since the blockchain is tamper-proof, the accuracy of data in the blockchain may be ensured. An electronic device (for example, the terminal device 400 or the server 200) may transmit a query request to the blockchain to query the data stored in the blockchain.

In some embodiments, the terminal device 400 or the server 200 may run a computer program to implement the artificial-intelligence-based image processing method provided by the embodiments of this application. For example, the computer program may be a native program or software module in an operating system, or a native application (APP), i.e., a program needs to be installed in the operating system to run, such as an image application (for example, a client 410 shown in FIG. 1, for example: the client 410 may be an APP for an image editing/video editing), or an applet, i.e., a program which only needs to be downloadable to a browser environment to run, or an applet embeddable into any APP, such as an applet component embedded into an image application, which may be controlled by a user to be run or closed. In general, the computer program may be any form of application, module, or plug-in.

In some embodiments, the server 200 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The cloud service may be an image processing service for the terminal device 400 to call. The terminal device 400 may be a smartphone, a tablet computer, a notebook computer, a desktop computer, a smart TV, a smart watch, or the like, but is not limited thereto. The terminal device and the server may be directly or indirectly connected in a wired or wireless communication manner. This is not limited in the embodiments of this application.

In the embodiments of this application, the database may provide a data support for the server. For example, the server may be connected with the database, and may obtain data in the database for corresponding processing, and store an obtained processing result in the database. For example, as shown in FIG. 1, the database 500 may be configured to store data related to image processing (including, but not limited to, the image to be processed, the background color, and the background image), and the server 200 may obtain the data in the database 500 for image processing.

In some embodiments, the database and the server may be disposed independently. In some embodiments, the database and the server may be integrated. That is, the database may be regarded as being present in the server and integrated with the server, and the server may provide a data management function for the database.

Figure 2:
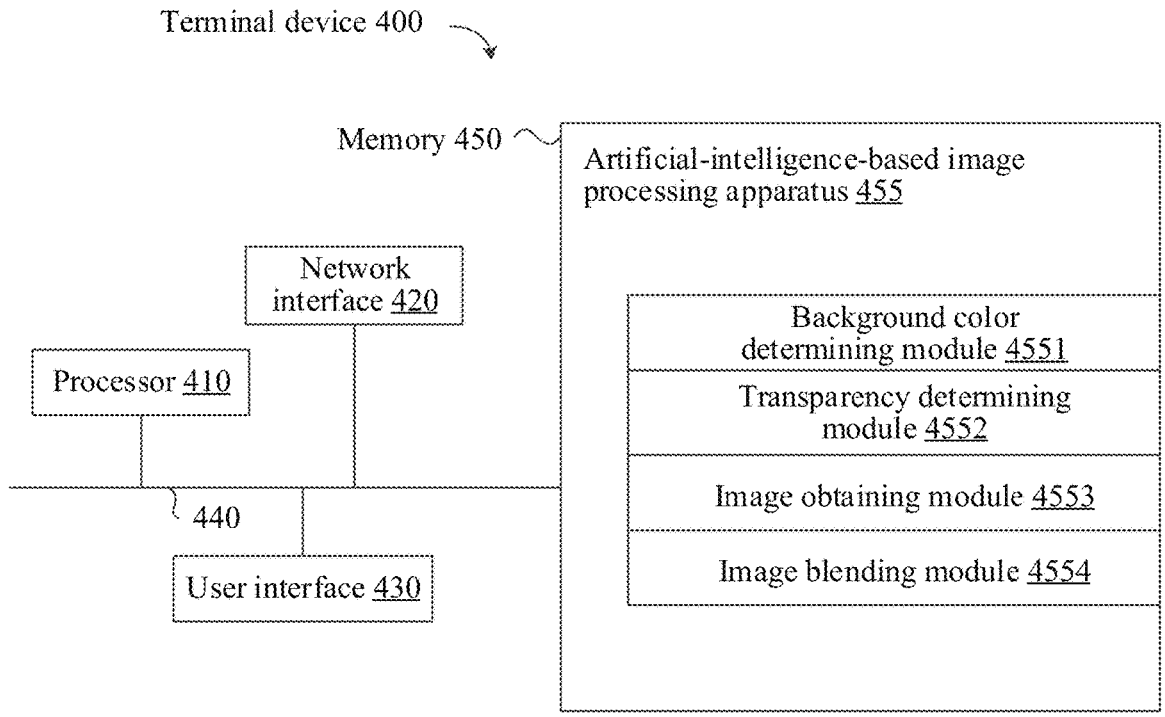
FIG. 2 is a schematic architectural diagram of a terminal device according to an embodiment of this application.

Descriptions are made taking the electronic device provided in the embodiments of this application being a terminal device as an example. It can be understood that, when the electronic device is a server, part of the structure shown in FIG. 2 (for example, a user interface, a display module, and an input processing module) may be default. FIG. 2 is a schematic structural diagram of a terminal device 400 according to an embodiment of this application. The terminal device 400 shown in FIG. 2 includes: at least one processor 410, a memory 450, at least one network interface 420, and a user interface 430. All the components in the terminal device 400 are coupled together by using a bus system 440. It may be understood that the bus system 440 is configured to implement connection and communication between the components. In addition to a data bus, the bus system 440 further includes a power bus, a control bus, and a status signal bus. However, for ease of clear description, all types of buses are labeled as the bus system 440 in FIG. 2.

In some embodiments, the artificial-intelligence-based image processing apparatus provided in the embodiments of this application may be implemented by software. FIG. 2 shows an artificial-intelligence-based image processing apparatus 455 stored in the memory 450, which may be software in form of a program, a plug-in, etc., including the following software modules: a background color determining module 4551, a transparency determining module 4552, an image obtaining module 4553, and an image blending module 4554. These modules are logical modules, and may be randomly combined or further divided based on a function to be performed. The functions of the module are explained below.

The artificial-intelligence-based image processing method provided in the embodiments of this application is described with reference to an application and implementation of the electronic device provided in one embodiment.

Figure 3A:
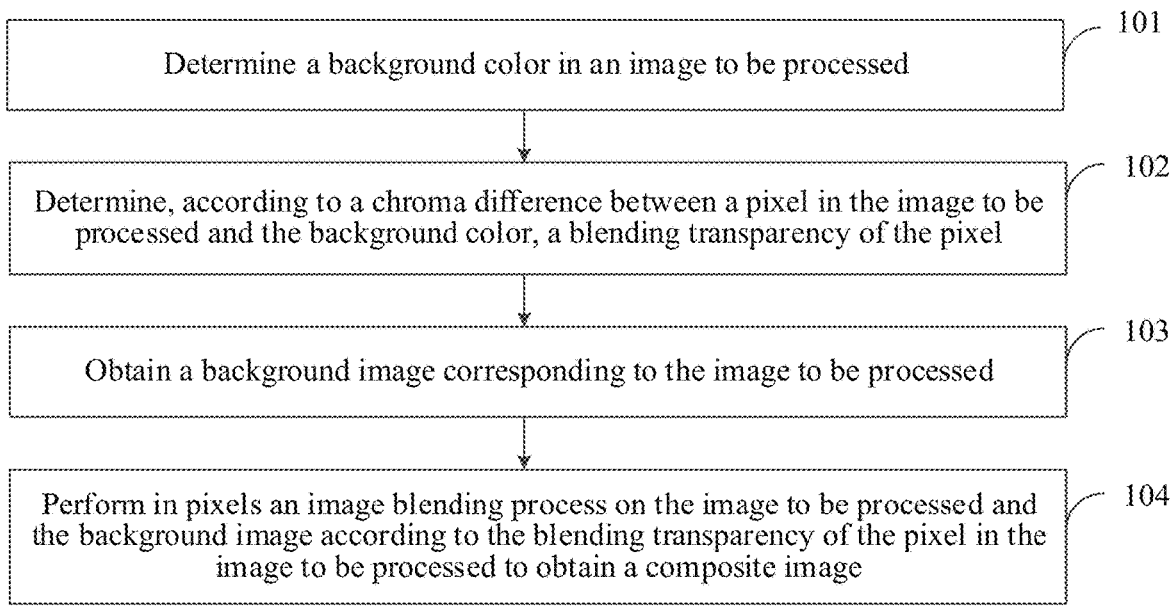
FIG. 3A is a schematic flowchart of an artificial-intelligence-based image processing method according to an embodiment of this application.

FIG. 3A is a schematic flowchart of an artificial-intelligence-based image processing method according to an embodiment of this application. Descriptions will be made in combination with the steps shown in FIG. 3A.

Step 101: Determine a background color in an image to be processed.

An image to be processed is obtained, and a background color to be keyed or overlaid in the image to be processed is determined. In one embodiment, the number of image bits of the image to be processed is not limited, which may be, for example, may be 8 bits, 16 bits, or 32 bits. A content in the image to be processed is also not limited, which may be, for example, a real person, a cat, or a dog. A size of the image to be processed is also not limited.

In one embodiment, an execution sequence of the step of obtaining an image to be processed and the step of determining a background color is not limited. For example, they may be performed one after the other (for example, the background color is determined and then the image to be processed is obtained, or the image to be processed is obtained and then the background color is determined), or may be performed at the same time. The determined background color is suitable for a specific image to be processed, or suitable for different images to be processed.

In some embodiments, step 101 may be implemented in any one of the following manners: obtaining a background color set for the image to be processed as the background color of the image to be processed; and performing a target recognition process on the image to be processed to obtain a target region, and determining a color corresponding to a maximum frequency of occurrence in a background region of the image to be processed as the background color of the image to be processed, the background region being a region different from the target region in the image to be processed.

One embodiment provides methods for determining the background color. In the first method, a background color set for the image to be processed is obtained. For example, a background color set by a user through a background color setting operation is obtained in response to the background color setting operation. The set background color is determined as the background color in the image to be processed. In this manner, a user requirement may be met maximally.

In the second method, a target recognition process is performed on the image to be processed to obtain a target region (also referred to as a foreground region), a region different from the target region in the image to be processed is determined as a background region, and a color corresponding to a maximum frequency of occurrence in the background region is determined as the background color. For example, the target recognition process may be performed through a target recognition model. The target recognition model may be a machine learning model constructed based on a machine learning (ML) principle, such as the you only look once (YOLO) model or a region-convolutional neural network (R-CNN) model. Machine learning is the core of artificial intelligence, specialized in studying how a computer simulates or implements human learning behaviors to obtain new knowledge or skills and reorganize an existing knowledge structure to continuously improve its own performance. In one embodiment, a type of a target to be recognized is not limited, which may include, for example, a person, a cat, and a dog.

After the background region is determined, a color corresponding to each pixel in the background region may be determined in pixels. The color may be represented by a channel value of the pixel corresponding to a channel in a color space. The color space is not limited, which may be, for example, a primary color space or a chroma-luminance separated color space. In general, the background color occupies a large proportion in the background region, so the color corresponding to the maximum frequency of occurrence (or maximum number of occurrence) in the background region may be determined as the background color. For example, if the background region includes totally 100 pixels, where colors corresponding to 60 pixels are color A, a frequency of occurrence of color A in the background region is maximum, i.e., 60/100, so color A is the determined background color. In the second method, the background color is determined automatically, so that user operations may be reduced effectively, the labor cost may be reduced (particularly when there are many image to be processed), and meanwhile, the accuracy of the determined background color may be ensured to some extent.

Step 102: Determine, according to a chroma difference between a pixel in the image to be processed and the background color, a blending transparency of the pixel.

For each pixel in the image to be processed, a chroma difference (also referred to as a chroma distance) between chroma of the pixel and chroma of the background color is determined, and a blending transparency of the pixel is determined according to the chroma difference. For example, the chroma difference may be directly determined as the blending transparency of the pixel, or the chroma difference may further be processed to obtain the blending transparency of the pixel.

In one embodiment, a method for determining the chroma difference is not limited. For example, the chroma difference may be obtained by subtracting the chroma of the background color from the chroma of the pixel. Alternatively, the chroma difference may be obtained by subtracting the chroma of the background color from the chroma of the pixel and then calculating an absolute value of an obtained result. Alternatively, the chroma difference may be obtained by subtracting the chroma of the background color from the chroma of the pixel and then calculating a square of an obtained result.

In one embodiment, the chroma includes at least one of a hue and a saturation. Therefore, in step 102, the blending transparency of the pixel may be determined according to a hue difference between a hue of the pixel and a hue of the background color. Alternatively, the blending transparency of the pixel may be determined according to a saturation difference between a saturation of the pixel and a saturation of the background color. Alternatively, both a hue difference and a saturation difference are calculated, and the blending transparency of the pixel is determined according to the hue difference and the saturation difference.

In some embodiments, the operation of determining, according to a chroma difference between a pixel in the image to be processed and the background color, a blending transparency of the pixel may be implemented in the following manner: converting the image to be processed and the background color into a same color space, the color space including multiple chroma channels; determining, for each chroma channel, a difference between a channel value of the pixel in the image to be processed corresponding to the chroma channel and a channel value of the background color corresponding to the chroma channel, and determining the determined difference as a chroma difference corresponding to the chroma channel; and performing a difference blending process on the multiple chroma differences in one-to-one correspondence to the multiple chroma channels to obtain the blending transparency of the pixel.

In order to ensure the accuracy of the obtained blending transparency, the image to be processed and the background color may be converted into a same color space. The color space may be a chroma-luminance separated color space, namely including multiple chroma channels. Each chroma channel may be used for representing only one property of the color, such as channel H (for representing the hue) and channel S (for representing the saturation) in an HSV color space and an HSL color space. Alternatively, each chroma channel may represent both the hue and the saturation, such as channels U and V in a YUV color space or channels A and B in a LAB color space.

For each pixel in the image to be processed, first for each chroma channel, a difference between a channel value of the pixel corresponding to the chroma channel (i.e., chroma in this chroma channel) and a channel value of the background color corresponding to the chroma channel is determined, and the determined difference is determined as a chroma difference corresponding to the chroma channel. Then, a difference blending process is performed on the chroma differences respectively corresponding to all the chroma channels to obtain the blending transparency of the pixel. A method for the difference blending process is not limited, which may be, for example, a summation process or a weighted summation process. In the foregoing method, the blending transparency is determined by combining the multiple chroma channels in the same color space, so that the accuracy and comprehensiveness of the obtained blending transparency may be improved.

Step 103: Obtain a background image corresponding to the image to be processed.

The background image is different from the image to be processed. In one embodiment, the number of image bits, content, size, and the like of the background image are also not limited, and the background image may be determined according to a specific application scene.

Step 104: Perform in pixels an image blending process on the image to be processed and the background image according to the blending transparency of the pixel in the image to be processed to obtain a composite image.

Compared with keying according to a tolerance range, in one embodiment, an image blending process is performed in pixels on the image to be processed and the background image according to the blending transparency of each pixel in the image to be processed to obtain a composite image. Since a method for the image blending process is smoother, edge details of the target (for example, hair details of a person) in the image to be processed may be retained. In one embodiment, a method for the image blending process is not limited, which may be, for example, a weighting process.

If the blending transparency of the pixel is higher, it indicates that the color corresponding to the pixel differs more greatly from the background color, and a retention degree of the color corresponding to the pixel in the composite image is higher. That is, the retention degree of the color corresponding to the pixel in the image to be processed in the composite image is positively correlated with the blending transparency of the pixel.

In some embodiments, the operation of performing in pixels an image blending process on the image to be processed and the background image according to the blending transparency of the pixel in the image to be processed to obtain a composite image may be implemented in the following manner: converting the image to be processed and the background image into a same color space, the color space including multiple channels; and performing the following processes for each channel: determining a first channel value of a first pixel in the image to be processed corresponding to the channel and a second channel value of a second pixel in the background image corresponding to the channel; and performing a weighting process on the first channel value and the second channel value according to a blending transparency of the first pixel to obtain a third channel value of a third pixel in the composite image corresponding to the channel, a pixel position of the first pixel, a pixel position of the second pixel, and a pixel position of the third pixel being in a mapping relationship.

In order to ensure the accuracy of the image blending process, the image to be processed and the background image may be converted into a same color space. The color space may be a primary color space or a chroma-luminance separated color space. The color space includes multiple channels.

For each pixel (referred to as a first pixel for ease of understanding) in the image to be processed, for each channel in the color space, a channel value (referred to as a first channel value for ease of understanding, the same is true below) of the first pixel corresponding to the channel and a second channel value of a second pixel in the background image corresponding to the channel are determined, and a weighting process is performed on the first channel value and the second channel value according to a blending transparency of the first pixel to obtain a third channel value of a third pixel in the composite image corresponding to the channel. A pixel position of the first pixel in the image to be processed, a pixel position of the second pixel in the background image, and a pixel position of the third pixel in the composite image are in a mapping relationship. For example, the image to be processed and the background image may be scaled to the same size, and then being in the mapping relationship refers to that the pixel positions are the same. Certainly, in one embodiment, the image to be processed and the background image are not necessarily scaled to the same size, and as long as the pixel position of the first pixel, the pixel position of the second pixel, and the pixel position of the third pixel are set to be in the mapping relationship, the image blending process may be performed even if the image to be processed is different from the background image in size.

In addition, performing the weighting process on the first channel value and the second channel value according to the blending transparency of the first pixel may refer to performing a weighted summation process on the first channel value and the second channel value taking the blending transparency of the first pixel as a weight of the first channel value and a complementary blending transparency corresponding to the blending transparency of the first pixel as a weight of the second channel value. A sum of the blending transparency of the first pixel and the corresponding complementary blending transparency is a maximum transparency within a transparency range, which is a value range of the blending transparency. In the foregoing method, the accuracy of the image blending process may be ensured, and the obtained composite image is relatively high in quality and accuracy.

As shown in FIG. 3A, in one embodiment, the blending transparency is determined, and the image blending process is performed based on the blending transparency. Compared with keying according to a tolerance range, the image processing solution provided in one embodiment is smoother, more edge details in the image to be processed may be retained, and the image processing accuracy is improved.

Figure 3B:
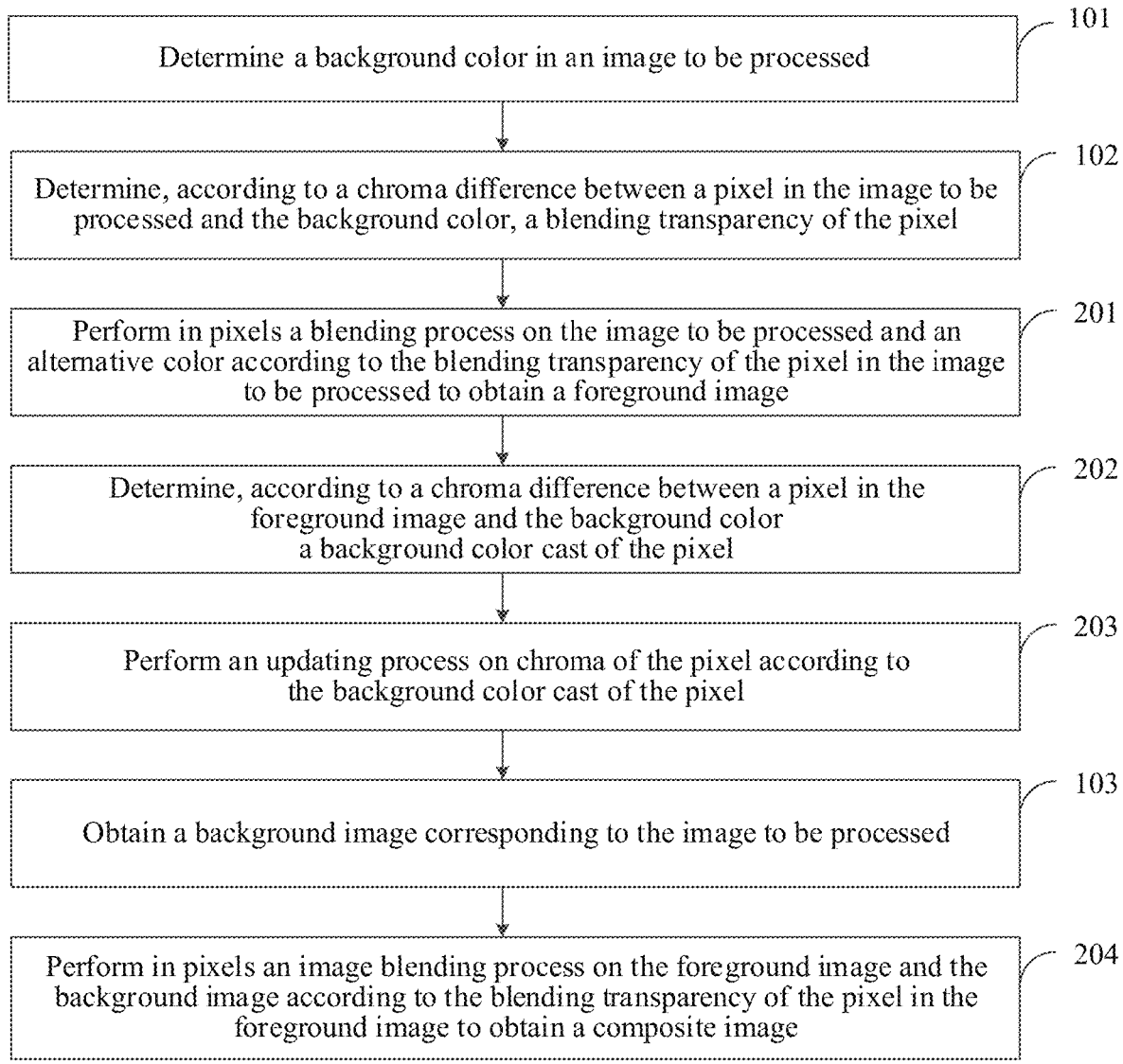
FIG. 3B is a schematic flowchart of an artificial-intelligence-based image processing method according to an embodiment of this application.

In some embodiments, FIG. 3B is a schematic flowchart of an artificial-intelligence-based image processing method according to an embodiment of this application. Based on FIG. 3A, after step 102, the method may further include the following steps. Step 201: Perform a blending process in pixels on the image to be processed and an alternative color according to the blending transparency of the pixel in the image to be processed to obtain a foreground image.

In one embodiment, color optimization may further be performed according to the background color. A blending process may be first performed in pixels on the image to be processed and an alternative color according to the blending transparency of the pixel in the image to be processed to obtain a foreground image.

For example, the image to be processed and the alternative color may be converted into a same color space. The color space may be a primary color space or a chroma-luminance separated color space. The color space includes multiple channels. For each pixel (referred to as a first pixel for ease of understanding) in the image to be processed, for each channel in the color space, a weighting process is performed on a channel value of the first pixel corresponding to the channel and a channel value of the alternative color corresponding to the channel according to the blending transparency of the first pixel to obtain a channel value of a fourth pixel in the foreground image corresponding to the channel. A pixel position of the first pixel in the image to be processed is the same as that of the fourth pixel in the foreground image.

The alternative color is used for removing the background color in the image to be processed. The alternative color may be set according to a specific application scene, for example, gray, namely a channel value of each channel in an RGB color space is 128.

Step 202: Determine, according to a chroma difference between a pixel in the foreground image and the background color, a background color cast of the pixel.

For example, for each pixel in the foreground image, a chroma difference between chroma of the pixel and chroma of the background color is determined, and a background color cast of the pixel is determined according to the chroma difference. For example, the chroma difference may be directly determined as the background color cast of the pixel, or the chroma difference may further be processed to obtain the background color cast of the pixel (if there are multiple chroma channels).

Since a color cast may be effectively reflected by a hue difference, a hue difference between a hue of the pixel and a hue of the background color may be determined, and the background color cast of the pixel is determined according to the hue difference. Therefore, the color optimization accuracy may be ensured on the basis of reducing calculation.

Step 203: Perform an updating process on chroma of the pixel according to the background color cast of the pixel.

The background color cast of the pixel reflects a shift degree (or referred to as a distinction degree and difference degree) between the chroma of the pixel and the chroma of the background color, so an updating process may be performed on the chroma of the pixel according to the background color cast of the pixel to avoid a color biased to the background color in the foreground image.

In some embodiments, the operation of performing an updating process on chroma of the pixel according to the background color cast of the pixel may be implemented in the following manner: keeping the chroma of the pixel unchanged when the background color cast of the pixel reaches a set degree of color cast; and performing, when the background color cast of the pixel does not reach the a set degree of color cast, a shifting process on chroma of the background color to obtain shifted chroma, and updating the chroma of the pixel to the shifted chroma.

When the background color cast of the pixel reaches a set degree of color cast, it indicates that the color of the pixel differs greatly from the background color, so chroma of the pixel may be kept unchanged. When the background color cast of the pixel does not reach the a set degree of color cast, it indicates that the color of the pixel differs slightly from the background color, so a shifting process may be performed on chroma of the background color to obtain shifted chroma, and the chroma of the pixel is updated to the shifted chroma. Performing the shifting process on the chroma of the background color does not represent updating the chroma of the background color. In fact, the shifting process is only for updating the chroma of the pixel, and the chroma of the background color is kept unchanged.

For ease of understanding, a description is made by using an example. First for each pixel in the foreground image, a hue difference between a hue of the pixel and a hue of the background color may be determined as a background color cast of the pixel. For example, the background color cast of the pixel may be obtained by subtracting the hue of the background color from the hue of the pixel. For ease of calculation, an updating process may further be performed on the background color cast. For example, when the background color cast is greater than $\pi$ (i.e., 180 degrees), the background color cast is updated to the background color cast minus $2\pi$. When the background color cast is less than $-\pi$ (i.e., $-180$ degrees), the background color cast is updated to the background color cast plus $2\pi$. When the background color cast is within a color cast range such as $[-\pi, \pi]$, the background color cast is kept unchanged.

Then, whether the background color cast of the pixel reaches a set degree of color cast is determined according to a set color cast threshold T. T is greater than 0 and less than π, and may be set according to a specific application scene, for example, π/16. For example, when the background color cast of the pixel is less than or equal to −T, or the background color cast of the pixel is greater than or equal to T, it is determined that the background color cast of the pixel reaches the a set degree of color cast, so that hue of the pixel is kept unchanged. When the background color cast of the pixel is less than 0 and greater than −T, it is determined that the background color cast of the pixel does not reach the a set degree of color cast, a shifting process is performed on the hue of the background color according to T, for example, T/2 is subtracted from the hue of the background color, to obtain a shifted hue, and the hue of the pixel is updated to the shifted hue. When the background color cast of the pixel is greater than 0 and less than T, it is determined that the background color cast of the pixel does not reach the a set degree of color cast, a shifting process is performed on the hue of the background color according to T, for example, T/2 is added to the hue of the background color, to obtain a shifted hue, and the hue of the pixel is updated to the shifted hue.

When the background color cast of the pixel is 0, T/2 may be subtracted from the hue of the background color to obtain a shifted hue, and the hue of the pixel is updated to the shifted hue. Alternatively, T/2 is added to the hue of the background color to obtain a shifted hue, and the hue of the pixel is updated to the shifted hue.

In the foregoing method, the effect of the updating process on the chroma of the pixel may be improved, a color biased to the background color in the foreground image is avoided effectively, and the improvement of the image quality of the subsequent composite image is facilitated, so that the image processing efficiency is improved.

In FIG. 3B, step 104 shown in FIG. 3A may be updated to step 204. Step 204: Perform in pixels an image blending process on the foreground image and the background image according to a blending transparency of the pixel in the foreground image to obtain a composite image.

An image blending process may be performed in pixels on the foreground image and the background image according to the blending transparency of each pixel in the foreground image to obtain a composite image. A method for the image blending process is similar to step 104.

As shown in FIG. 3B, in one embodiment, color optimization is performed on the image to be processed to obtain the foreground image, and the image blending process is performed on the foreground image and the background image. Therefore, the image processing accuracy may further be improved.

Figure 3C:
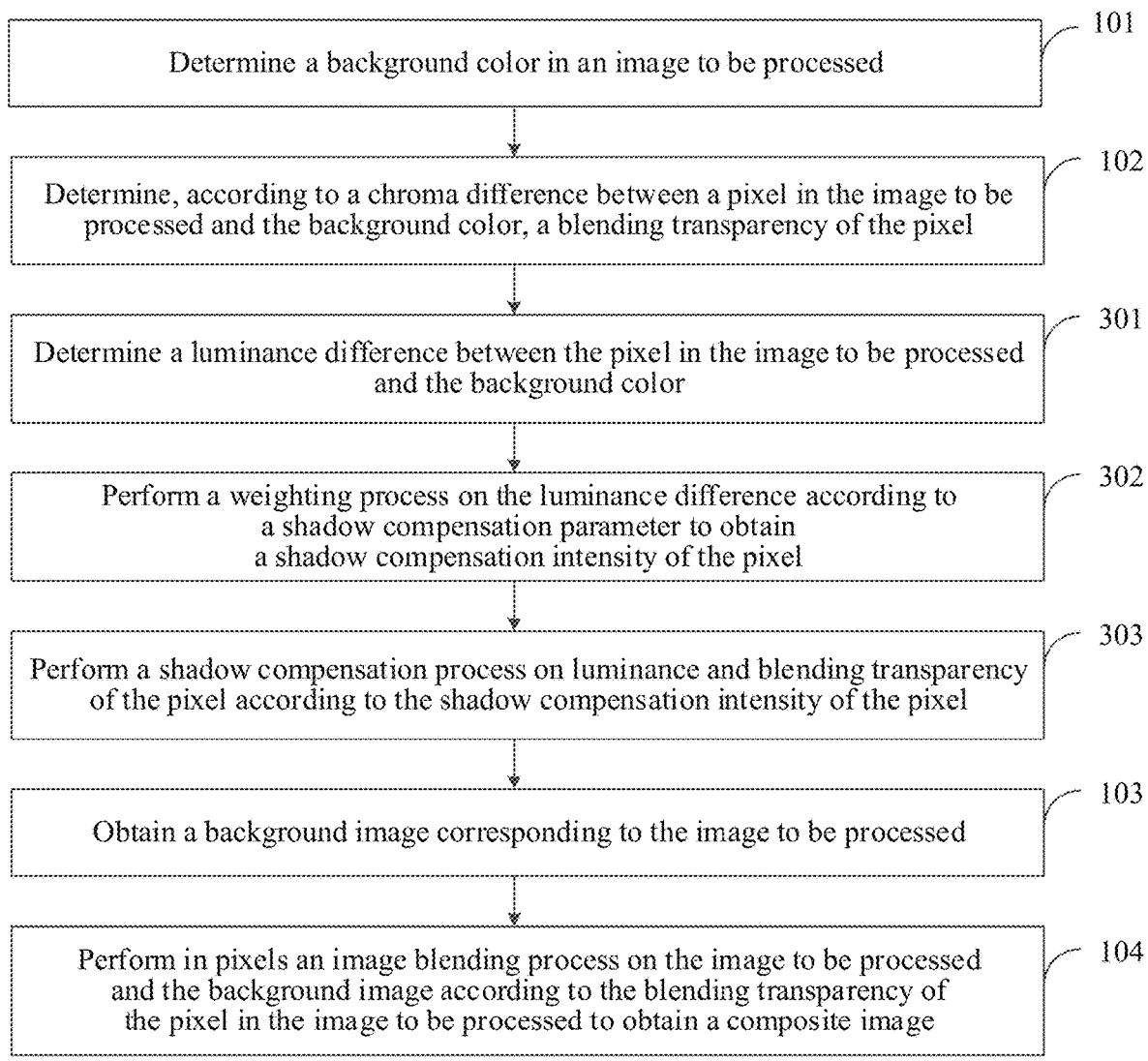
FIG. 3C is a schematic flowchart of an artificial-intelligence-based image processing method according to an embodiment of this application.

In some embodiments, 3C, FIG. 3C is a schematic flowchart of an artificial-intelligence-based image processing method according to an embodiment of this application. Based on FIG. 3A, after step 102, the method may further include the following steps. Step 301: Determine a luminance difference between the pixel in the image to be processed and the background color.

In one embodiment, shadow optimization (or referred to as highlight optimization) may be performed on the image to be processed. For example, the image to be processed and the background color may be converted into a same color space. The color space may be a chroma-luminance separated color space, namely including a luminance channel. For each pixel in the image to be processed, a difference between a channel value of the pixel corresponding to the luminance channel (i.e., luminance in this luminance channel) and a channel value of the background color corresponding to the luminance channel is determined, and the determined difference is determined as a luminance difference.

Step 302: Perform a weighting process on the luminance difference according to a shadow compensation parameter to obtain a shadow compensation intensity of the pixel.

A weighting process is performed on the luminance difference of the pixel according to a set shadow compensation parameter to obtain a shadow compensation intensity of the pixel. The shadow compensation parameter is positively correlated with the shadow compensation intensity, and may be set as required in a specific application scene.

In some embodiments, after step 302, the method further includes: performing a restriction process on the shadow compensation intensity of the pixel according to an intensity range.

The shadow compensation intensity is obtained by performing the weighting process on the luminance difference according to the shadow compensation parameter, and thus may be beyond an intensity range. The intensity range refers to a normal value range of the shadow compensation intensity. Therefore, in one embodiment, a restriction process may be performed on a shadow compensation intensity of each pixel in the image to be processed according to the intensity range, to ensure that the shadow compensation intensity after the restriction process is within a normal range.

In some embodiments, the intensity range includes a minimum intensity and a maximum intensity. The operation of performing a restriction process on the shadow compensation intensity of the pixel according to an intensity range may be implemented in the following manner: updating the shadow compensation intensity to the minimum intensity when the shadow compensation intensity is less than the minimum intensity; keeping the shadow compensation intensity unchanged when the shadow compensation intensity is within the intensity range; and updating the shadow compensation intensity to the maximum intensity when the shadow compensation intensity is greater than the minimum intensity.

The intensity range may be an interval of [minimum intensity, maximum intensity]. The shadow compensation intensity is updated to the minimum intensity when the shadow compensation intensity is less than the minimum intensity. The shadow compensation intensity is kept unchanged when the shadow compensation intensity is within the interval of [minimum intensity, maximum intensity]. The shadow compensation intensity is updated to the maximum intensity when the shadow compensation intensity is greater than the minimum intensity. In this method, it may be effectively ensured that the shadow compensation intensity after the restriction process is within the intensity range.

Step 303: Perform a shadow compensation process on luminance and blending transparency of the pixel according to the shadow compensation intensity of the pixel.

For each pixel in the image to be processed, a shadow compensation process is performed on luminance and blending transparency of the pixel according to the shadow compensation intensity of the pixel. The shadow compensation process may be an increase process, and the shadow compensation intensity is positively correlated with an amplitude of the increase process. Therefore, a shadow in the image to be processed may be simulated more accurately in a finally obtained composite image, which is conducive to improving the image quality of the subsequent composite image to further improve the image processing efficiency.

In some embodiments, the operation of performing a shadow compensation process on luminance and blending transparency of the pixel according to the shadow compensation intensity of the pixel may be implemented in the following manner: performing a luminance increase process on the pixel according to the shadow compensation intensity, luminance, and blending transparency of the pixel, and performing, according to a luminance range, a restriction process on luminance obtained by the luminance increase process; and performing a blending transparency increase process on the pixel according to the shadow compensation intensity and blending transparency of the pixel, and performing, according to a transparency range, a restriction process on a blending transparency obtained by the blending transparency increase process.

For luminance of the pixel, a luminance increase process may be performed on the pixel according to the shadow compensation intensity, luminance, and blending transparency of the pixel. The shadow compensation intensity of the pixel is positively correlated with an increase intensity of the luminance increase process. In one embodiment, a method for the luminance increase process is not limited. When a luminance range (i.e., value range of the luminance) is [0, 1], luminance obtained by the luminance increase process may be represented as $$Y_f + \frac{1-\alpha}{e+\alpha} \cdot Y_c,$$

where $Y_f$ represents the luminance of the pixel before the luminance increase process, $\alpha$ represents the blending transparency of the pixel (blending transparency before a blending transparency increase process), and $Y_c$ represents the shadow compensation intensity of the pixel. In addition, e is a parameter set to avoid a numeric overflow, which may be set to, for example, 0.01. The luminance obtained by the luminance increase process may be beyond the luminance range. Therefore, a restriction process may further be performed, according to the luminance range, on the luminance obtained by the luminance increase process, and luminance obtained by the restriction process is determined as new luminance of the pixel. The restriction process of the luminance is similar to the foregoing restriction process of the shadow compensation intensity.

For the blending transparency of the pixel, a blending transparency increase process may be performed on the pixel according to the shadow compensation intensity and blending transparency of the pixel. The shadow compensation intensity of the pixel is positively correlated with an increase intensity of the blending transparency increase process. In one embodiment, a method for the blending transparency increase process is not limited. When a transparency range (i.e., value range of the blending transparency) is [0, 1], a blending transparency obtained by the blending transparency increase process may be represented as $(1-\alpha) \cdot |Y_c| + \alpha$, where $\alpha$ represents the blending transparency of the pixel before the blending transparency increase process, $Y_c$ represents the shadow compensation intensity of the pixel, and $|Y_c|$ refers to an absolute value operation for $Y_c$. The blending transparency obtained by the blending transparency increase process may be beyond the blending transparency range. Therefore, a restriction process may further be performed, according to the blending transparency range, on the blending transparency obtained by the blending transparency increase process, and a blending transparency obtained by the restriction process is determined as a new blending transparency of the pixel. The restriction process of the blending transparency is similar to the foregoing restriction process of the shadow compensation intensity.

In the foregoing method, the shadow compensation process may be implemented accurately and effectively, so that a shadow in the image to be processed may further be simulated accurately in a finally obtained composite image.

In some embodiments, shadow optimization may be performed on the foreground image. That is, the image to be processed in step 301 may be replaced with the foreground image.

In some embodiments, shadow optimization may be performed on the composite image. That is, the image to be processed in step 301 may be replaced with the composite image. It is no longer necessary to update the blending transparency for the composite image. Therefore, in such case, step 303 may be updated as: performing a shadow compensation process on luminance of the pixel according to the shadow compensation intensity of the pixel.

As shown in FIG. 3C, in one embodiment, the shadow compensation intensity is determined according to the luminance difference, and the shadow compensation process is performed according to the shadow compensation intensity. Therefore, shadow optimization may be implemented effectively, and a shadow/highlight in the image to be processed may be simulated accurately in a finally obtained composite image, which is conducive to improving the image quality of the subsequent composite image to further improve the image processing efficiency.

Figure 3D:
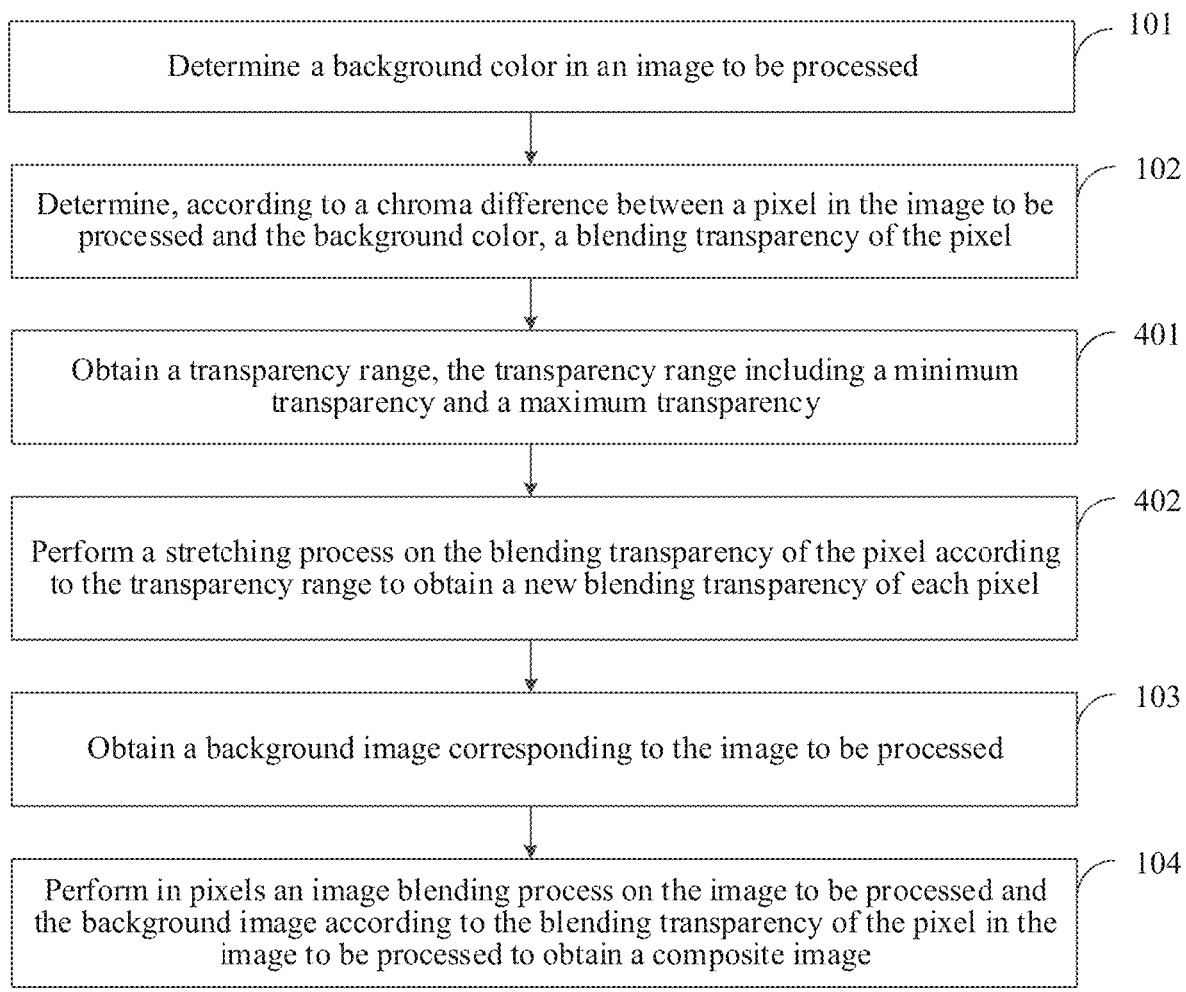
FIG. 3D is a schematic flowchart of an artificial-intelligence-based image processing method according to an embodiment of this application.

In some embodiments, FIG. 3D is a schematic flowchart of an artificial-intelligence-based image processing method according to an embodiment of this application. Based on FIG. 3A, after step 102, the method may further include the following steps. Step 401: Obtain a transparency range, the transparency range including a minimum transparency and a maximum transparency.

The transparency range may be a value range of the blending transparency, and may be represented as an interval of [minimum transparency, maximum transparency].

Step 402: Perform a stretching process on the blending transparency of the pixel according to the transparency range to obtain a new blending transparency of each pixel, the new blending transparencies of at least part of pixels in the image to be processed being the minimum transparency, and the new blending transparencies of at least part of remaining pixels being the maximum transparency.

A stretching process is performed on a blending transparency on each pixel in the image to be processed according to the transparency range such that the blending transparencies of the respective pixels in the image to be processed after the stretching process are distributed more smoothly and uniformly. Therefore, the effect of a subsequent image blending process may be improved. During the stretching process, the blending transparencies of at least part of pixels in the image to be processed are updated to the minimum transparency, and the blending transparencies of at least part of remaining pixels are updated to the maximum transparency.

In some embodiments, the operation of performing a stretching process on the blending transparency of the pixel according to the transparency range may be implemented in the following manner: determining the minimum transparency as the new blending transparency when the blending transparency is less than a first transparency threshold; determining, when the blending transparency is greater than or equal to the first transparency threshold and less than a second transparency threshold, an intermediate transparency according to the blending transparency, the first transparency threshold, and the second transparency threshold, and determining the intermediate transparency as the new blending transparency; and determining the maximum transparency as the new blending transparency when the blending transparency is greater than or equal to the second transparency threshold, the first transparency threshold being less than the second transparency threshold, and the first transparency threshold, the second transparency threshold, and the intermediate transparency being all within the transparency range.

In one embodiment, the stretching process may be performed on the blending transparency of the pixel according to a set first transparency threshold and second transparency threshold. Both the first transparency threshold and the second transparency threshold are within the transparency range, and may be set according to a specific application scene. For example, when the transparency range is [0, 1], the first transparency threshold may be set to 0.001, and the second transparency threshold may be set to 0.01.

For each pixel in the image to be processed, the blending transparency of the pixel is updated to the minimum transparency when the blending transparency of the pixel is less than the first transparency threshold. When the blending transparency of the pixel is greater than or equal to the first transparency threshold and less than the second transparency threshold, an intermediate transparency is determined according to the blending transparency of the pixel, the first transparency threshold, and the second transparency threshold, and the blending transparency of the pixel is updated to the intermediate transparency. The blending transparency of the pixel is updated to the maximum transparency when the blending transparency is greater than or equal to the second transparency threshold. The intermediate transparency corresponding to the pixel is also within the transparency range and positively correlated with the blending transparency of the pixel before updating. In one embodiment, a method for determining the intermediate transparency is not limited. For example, the intermediate transparency may be $$\frac{\alpha - T_1}{T_2 - T_1},$$

where $\alpha$ represents the blending transparency of the pixel before updating, $T_1$ represents the first transparency threshold, and $T_2$ represents the second transparency threshold. One embodiment provides the foregoing method for the stretching process. Processing according to different interval segments may improve the effectiveness of the stretching process.

As shown in FIG. 3D, in one embodiment, the stretching process is performed on the blending transparency of each pixel in the image to be processed, so that the blending transparencies are distributed more smoothly and uniformly, and the effect of the subsequent image blending process is improved, namely the quality of the final composite image is improved. Therefore, the image processing efficiency is improved.

Figure 3E:
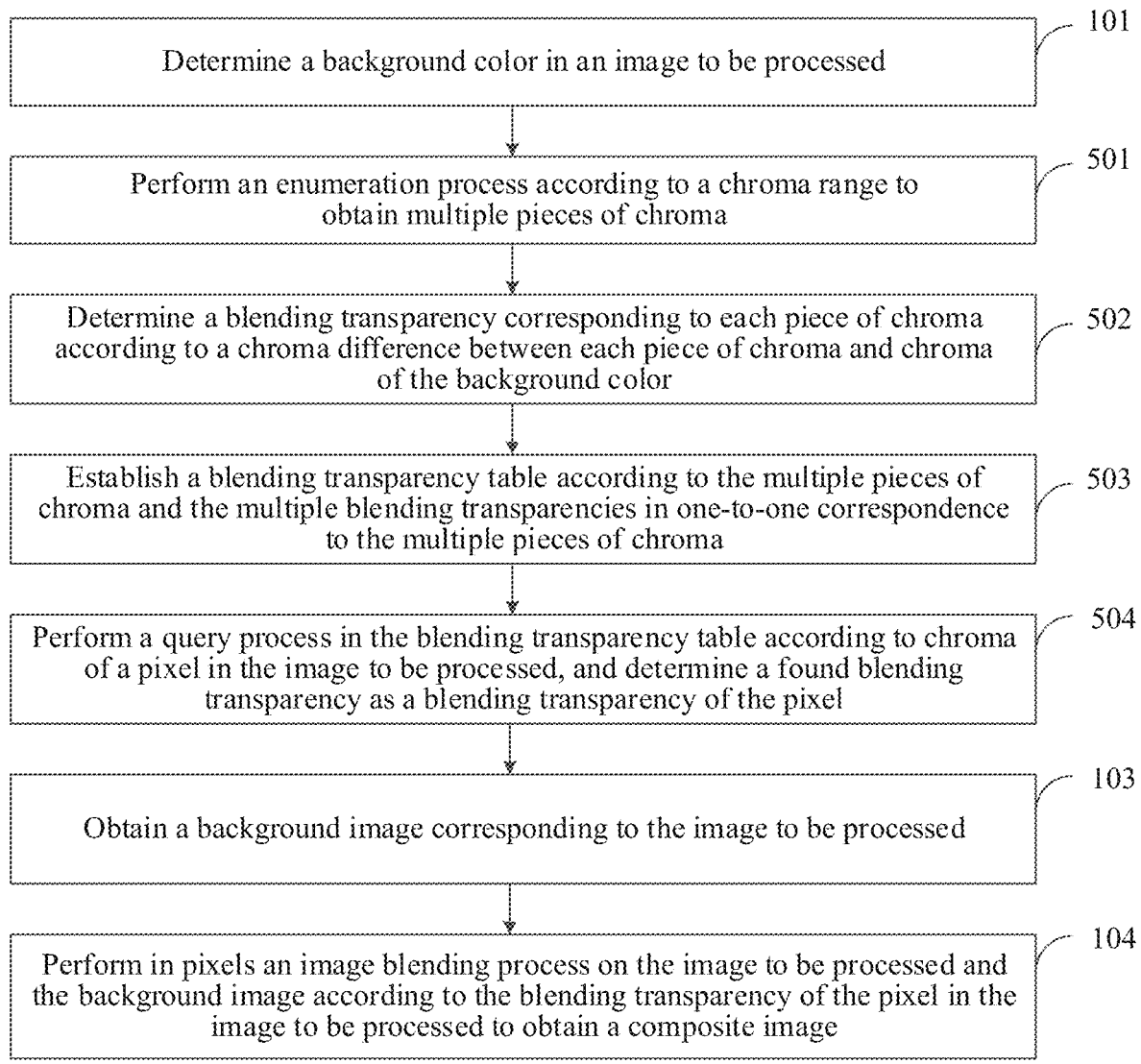
FIG. 3E is a schematic flowchart of an artificial-intelligence-based image processing method according to an embodiment of this application.

In some embodiments, FIG. 3E is a schematic flowchart of an artificial-intelligence-based image processing method according to an embodiment of this application. Based on FIG. 3A, before step 102, the method may further include the following steps. Step 501: Perform an enumeration process according to a chroma range to obtain multiple pieces of chroma.

In one embodiment, the image processing efficiency may be improved by table lookup acceleration. For example, an enumeration process may be performed according to a chroma range (i.e., a value range of chroma) to obtain all possible chroma.

Step 502: Determine a blending transparency corresponding to each piece of chroma according to a chroma difference between each piece of chroma and chroma of the background color.

For each piece of chroma obtained by the enumeration process, a blending transparency corresponding to the chroma is determined according to a chroma difference between the chroma and chroma of the background color. In some embodiments, a stretching process may further be performed on the blending transparency corresponding to the chroma according to a transparency range.

Step 503: Establish a blending transparency table according to the multiple pieces of chroma and the multiple blending transparencies in one-to-one correspondence to the multiple pieces of chroma.

A blending transparency table may be established according to all the chroma obtained by the enumeration process and the blending transparency corresponding to each piece of chroma. The blending transparency table stores correspondences between the chroma and the blending transparencies. That is, the chroma may be determined as an index of the blending transparency.

Steps 501 to 503 may be performed before the image to be processed is obtained, to reduce the adverse impact on a real-time image processing process (referring here to a process of processing the obtained image to be processed).

In FIG. 3E, step 102 shown in FIG. 3A may be updated to step 504. Step 504: Perform a query process in the blending transparency table according to chroma of a pixel in the image to be processed, and determine a found blending transparency as a blending transparency of the pixel.

After the image to be processed is obtained, for each pixel in the image to be processed, a query process may be performed in the blending transparency table according to chroma of a pixel in the image to be processed, and a found blending transparency corresponding to the chroma is determined as a blending transparency of the pixel. Therefore, the efficiency of determining the blending transparency of the pixel may be improved greatly by a query mechanism.

In some embodiments, in addition to the blending transparency table, another table may be established for table lookup acceleration. For example, for a color optimization process, an enumeration process may be performed according to a transparency range and a chroma range to obtain all possible blending transparency-chroma combinations. For each blending transparency-chroma combination, an updating process is performed on chroma in a method similar to steps 201 to 203. Then, an updated chroma table is established according to all the blending transparency-chroma combinations and chroma corresponding to each blending transparency-chroma combination after the updating process. In the updated chroma table, the blending transparency-chroma combination may be determined as an index of the chroma after the updating process.

In another example, for a shadow optimization process, an enumeration process may be performed according to a transparency range and a luminance range to obtain all possible blending transparency-luminance combinations. For each blending transparency-luminance combination, a shadow compensation process is performed on a blending transparency and luminance in a method similar to steps 301 to 303. Then, a compensated blending transparency table is established according to all the blending transparency-luminance combinations and a blending transparency corresponding to each blending transparency-luminance combination after the shadow compensation process. In the compensated blending transparency table, the blending transparency-luminance combination may be determined as an index of the blending transparency after the shadow compensation process. A compensated luminance table is established according to all the blending transparency-luminance combinations and luminance corresponding to each blending transparency-luminance combination after the shadow compensation process. In the compensated luminance table, the blending transparency-luminance combination may be determined as an index of the luminance after the shadow compensation process. In the foregoing method, the comprehensiveness of table lookup acceleration may be improved.

As shown in FIG. 3E, in one embodiment, table lookup acceleration may greatly improve the image processing efficiency while reducing the computing load of real-time image processing to facilitate deployment of the image processing solution provided in one embodiment in various types of electronic devices (for example, a mobile phone).

The following describes an application of one embodiment in a practical application scenario. The embodiments of this application may be applied to various scenes related to image keying, as exemplified below.

Figure 4:
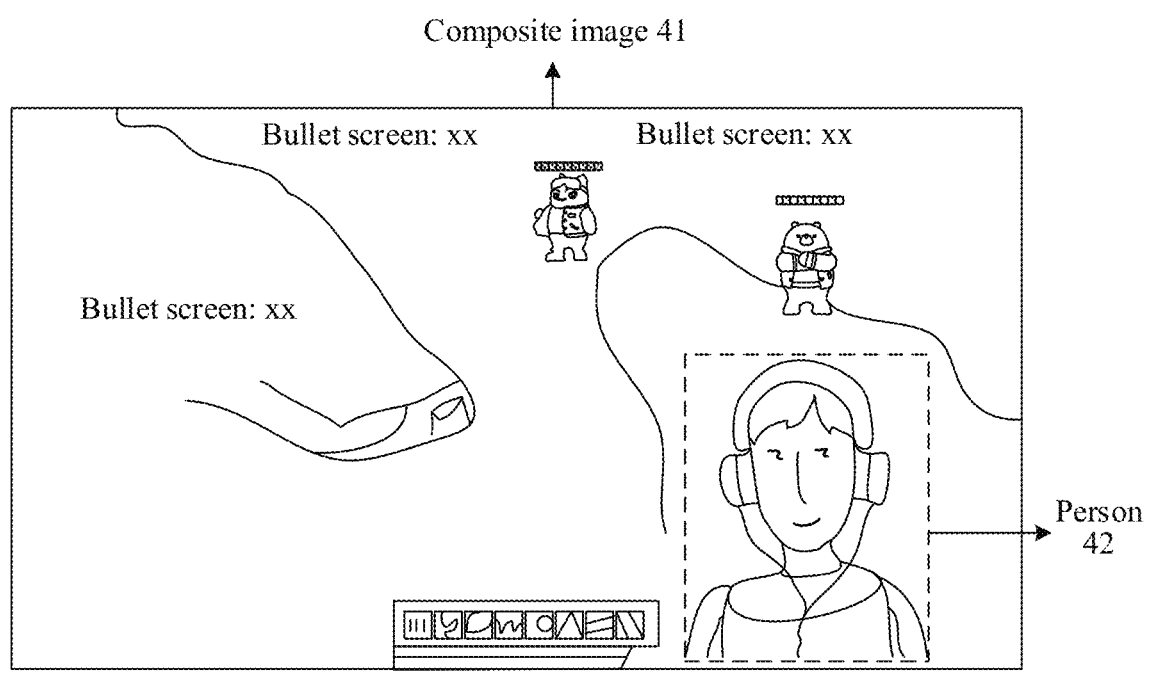
FIG. 4 is a schematic diagram of a composite image according to an embodiment of this application.

1) In a live streaming/star accompanying scene, a real person in an image to be processed may be blended (overlaid) together with a specific background, to improve the perception of the image. As shown in FIG. 4, a composite image 41 includes an original person 42 in an image to be processed, as well as a virtual game background in a background image and bullet screens. Both the virtual game background and the bullet screens are displayed in a region beyond a region where the person 42 in the composite image 41 is.

Figure 5:
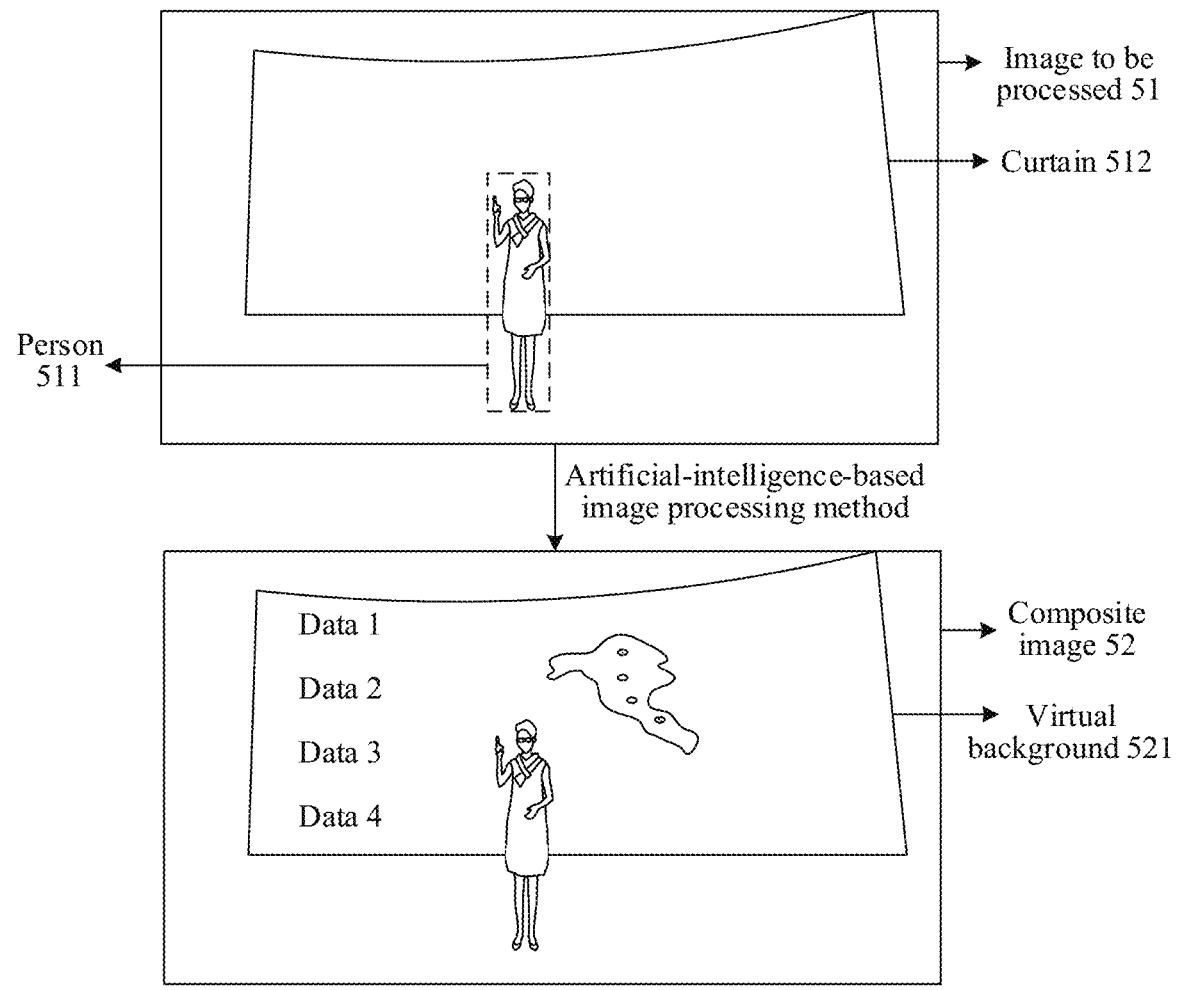
FIG. 5 is a schematic diagram of an image to be processed and a composite image according to an embodiment of this application.

2) In virtual film production, real persons may be blended with virtual scenes, to obtain cool and flexible special effects of pictures and bring good special effect experience to variety shows, live streaming, video on demand, etc. As shown in FIG. 5, an image to be processed 51 includes a person 511 and curtain 512. The person 511 stands in front of the curtain 512. The curtain 512 is a green curtain or a blue curtain, for example. The image to be processed 51 may be processed by the solution provided in the embodiments of this application to obtain a composite image 52. In the composite image 52, the curtain 512 is replaced with a virtual background 521. A background color during image processing is a color of the curtain 512. The virtual background 521 may be defined as required in a specific application scene.

3) The image processing solution provided in the embodiments of this application may be deployed as on-line service or off-line service for application to various types of image editing/video editing.

Compared with a solution provided in the related art (for example, a super key algorithm), the embodiments of this application may at least have the following technical effects. 1) Edge details in the image to be processed may be retained to implement hair-level keying and improve the image processing accuracy. 2) A shadow/highlight in the background region in the image to be processed may be retained to ensure a more realistic effect during use in combination with another special effect filter (for example, a virtual background). 3) High-quality keying may be performed for a semitransparent object (for example, a glass), to ensure accurate presentation of the semitransparent object in the composite image. 4) The situation that the foreground is biased to the background color (for example, when a green curtain is used, a person in a finally obtained image is greenish) is alleviated, and the visual effect is improved.

Figure 6:
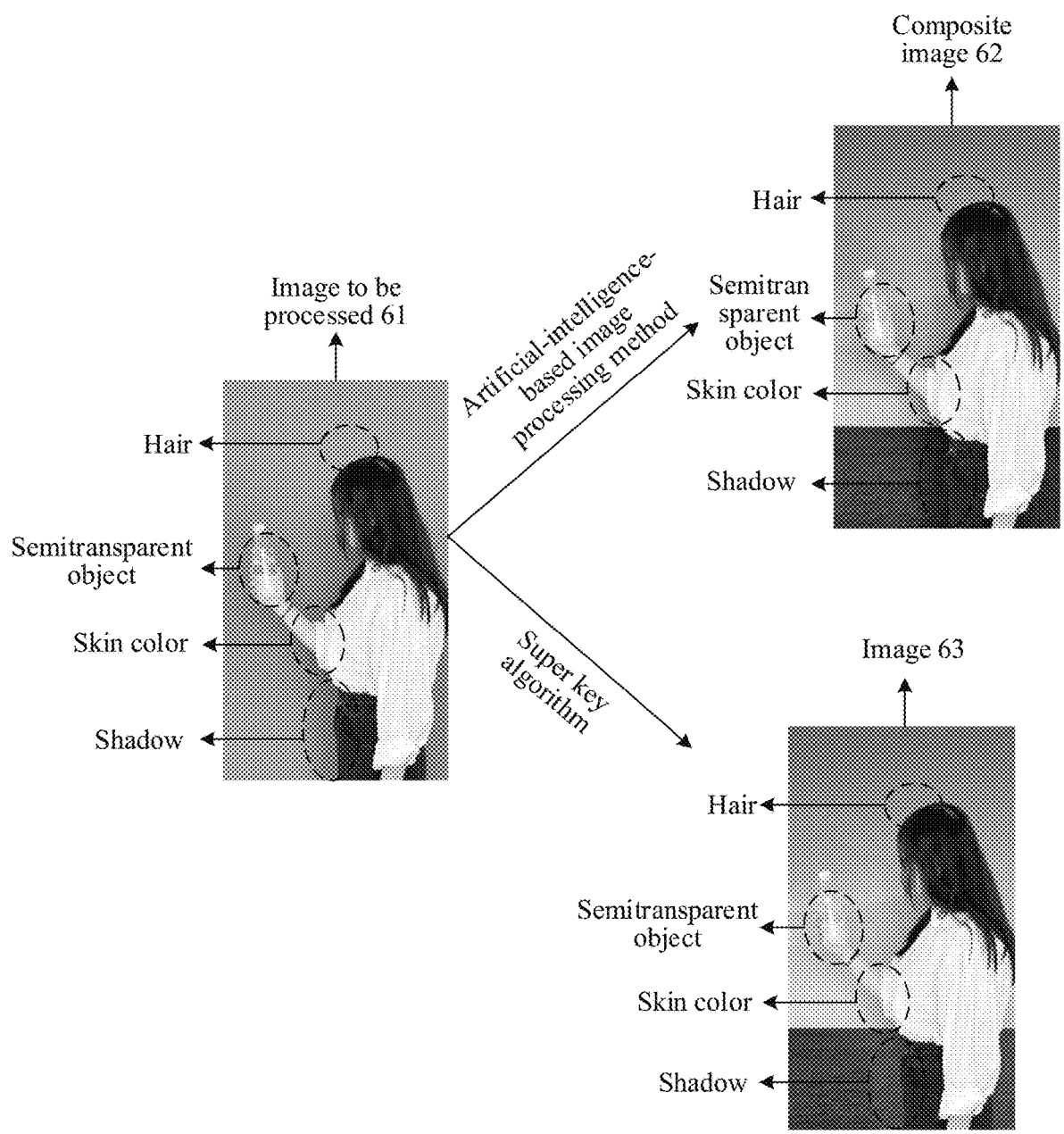
FIG. 6 is a schematic comparison diagram of blending effects according to an embodiment of this application.

A schematic comparison diagram shown in FIG. 6 is provided as evidence. An image to be processed 61 is processed by the solution provided in the embodiments of this application to obtain a composite image 62, and the image to be processed 61 is processed by a super key algorithm provided in the related art to obtain an image 63. Virtual backgrounds in the composite image 62 and the image 63 are the same. It may be determined according to FIG. 6 that, for hair of a person, the composite image 62, retains hair details in the image to be processed 61 more accurately than the image 63; for a semitransparent object, the composite image 62 may present the semitransparent image more accurately than the image 63 without distortion and blurring; for the skin color, the composite image 62 may reproduce the skin color in the image to be processed 61 better, and the skin color in the image 63 may be biased to red; and for a shadow, the composite image 62 may simulate the shadow in the image to be processed 61 more accurately than the image 63. In addition, there is no green edge for a person in the composite image 62 (taking the background in the image to be processed 61 being a green curtain and the background color during image processing being green as an example).

The image processing solution provided in the embodiments of this application is next described from the angle of underlying implementation. In the embodiments of this application, two steps may be included. In the first step, a foreground image and a transparency channel image are calculated according to a received image to be keyed (corresponding to the foregoing image to be processed). In the second step, the foreground image is overlaid over a background image. Table lookup acceleration may be performed on the first step as actually required, which will be described later.

Figure 7:
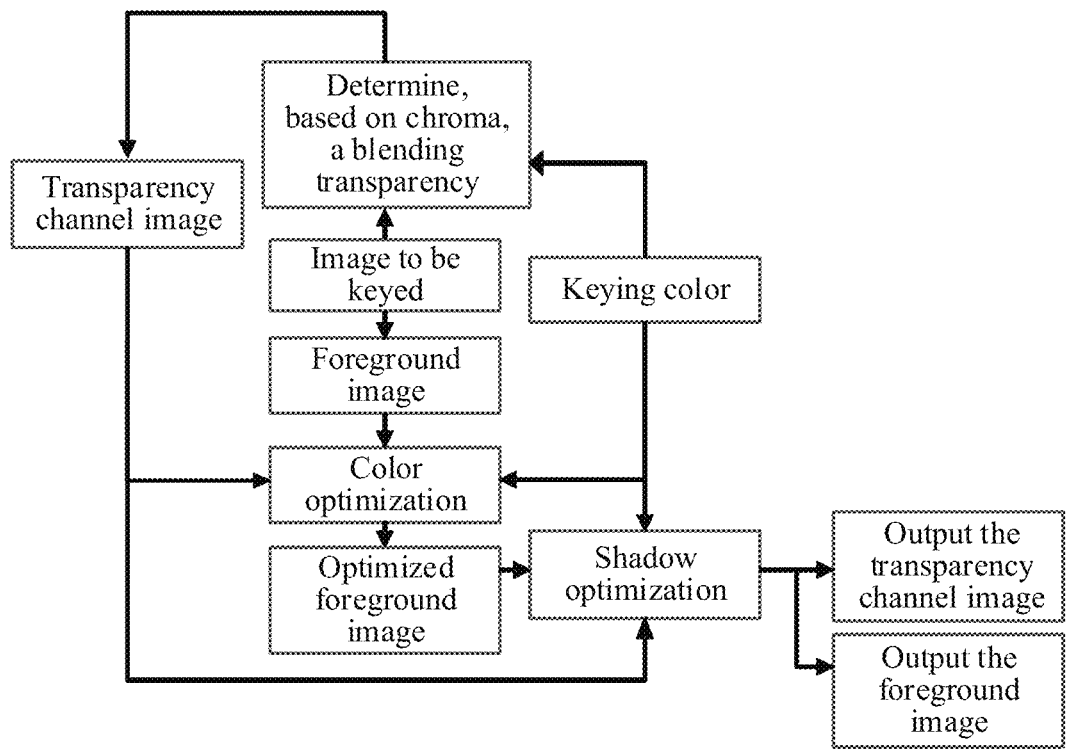
FIG. 7 is a schematic flowchart of determining a foreground image and a transparent channel image according to an embodiment of this application.

The embodiments of this application provide a schematic flowchart of calculating a foreground image and a transparency channel image, as shown in FIG. 7. The foregoing first step may be implemented by steps 1 to 7, which will be described in combination with FIG. 7.

Step 1: Set a keying color $C_k$ (corresponding to the foregoing background color). The keying color may be set by a user according to a specific application scene. For example, the keying color may be consistent with a color of a curtain in the image to be keyed. For example, if the curtain in the image to be keyed is a green curtain, the keying color may be set to green correspondingly.

Step 2: Convert an image to be keyed I and the keying color $C_k$ to a same color space. The color space includes at least a chroma channel. For example, the color space may be YUV, LAB, HSL, and HSV. No limits are made thereto. For ease of description, the color space herein is a floating-point type YUV color space, for example. In such case, when the image to be keyed I and the keying color $C_k$ are converted to the YUV color space, channel values respectively corresponding to channels Y, U, and V are normalized to a range of [0, 1].

Step 3: Calculate a transparency channel image a based on a hue and a saturation. Step 3 may be implemented by steps (1) and (2).

Step (1): Determine a blending transparency of each pixel in the image to be keyed I based on channels U and V. This is because chroma channels of the YUV color space include channels U and V. Taking an $i^{th}$ pixel in the image to be keyed I as an example, a blending transparency of the $i^{th}$ pixel may be determined through the following formula (1):

$$\alpha_i = (U_i - U_k)^2 + (V_i - V_k)^2 \quad (1),$$

where $\alpha_i$ represents the blending transparency of the $i^{th}$ pixel, $U_i$ represents a channel value of the $i^{th}$ pixel corresponding to channel U, $U_k$ represents a channel value of the keying color $C_k$ corresponding to channel U, $V_i$ represents a channel value of the $i^{th}$ pixel corresponding to channel V, and $V_k$ represents a channel value of the keying color $C_k$ corresponding to channel V. In addition, $(U_i - U_k)^2$ represents a chroma difference corresponding to channel U, and $(V_i - V_k)^2$ represents a chroma difference corresponding to channel V.

In one embodiment, a counting sequence of pixels in the image to be keyed I is not limited. For example, the pixels may be counted from top to bottom or from left to right. For example, the first pixel may be a top-left pixel in the image to be keyed I, and the second pixel may be an adjacent pixel on the right of the first pixel.

Step (2): Perform a stretching process on the blending transparency of each pixel according to a transparency range (i.e., the range of [0, 1]) to update the blending transparency. Taking the blending transparency $\alpha_i$ of the $i^{th}$ pixel as an example, a function for the stretching process is described with formula (2):

$$f(\alpha_i) = \begin{cases} 1, & T_2 \leq \alpha_i \\ \dfrac{\alpha_i - T_1}{T_2 - T_1}, & T_1 \leq \alpha_i < T_2, \\ 0, & \alpha_i < T_1 \end{cases} \quad (2)$$

where $T_1$ corresponds to the foregoing first transparency threshold, and $T_2$ corresponds to the foregoing second transparency threshold. $T_1$ is less than $T_2$. For example, $T_1$ is valued to 0.001, and $T_2$ is valued to 0.01.

$$\dfrac{\alpha_i - T_1}{T_2 - T_1}$$

corresponds to the foregoing intermediate transparency.

After the stretching process, the transparency channel image a may be obtained. Each blending transparency in the transparency channel image a corresponds to a pixel in the image to be keyed I.

Step 4: Perform a copying process on the image to be keyed I to obtain a foreground image $I_f$.

Step 5 is an optional color optimization step, and may be implemented by steps (1) and (2).

Step (1): Remove the keying color, namely remove the keying color in the foreground image $I_f$ to update the foreground image $I_f$. The keying color in the foreground image $I_f$ may be removed according to a set alternative color. The alternative color may be set according to a specific application scene. Taking gray $C_{gray}$ as an example for description, a channel value of $C_{gray}$ corresponding to each channel in an RGB color space is 128. The process of removing the keying color is described with function $S(I_f)$, referring to the following formula (3):

$$S(I_f) = (1-\alpha) \cdot C_{gray} + \alpha \cdot I_f \quad (3).$$

Step (2): Remove a foreground color cast, namely remove a color cast with a bias to the keying color in a foreground edge of the foreground image $I_f$. Step (2) may be implemented by steps a and b.

Step a: Convert the foreground image $I_f$ and the keying color $C_k$ to a same color space. For ease of description, the color space is an HSV color space or HSL color space, for example. Certainly, another color space such as a YUV color space may be used.

For each pixel in the foreground image $I_f$, a channel value $H_f$ of the pixel corresponding to a hue channel (i.e., channel H) is determined. Meanwhile, a channel value $H_k$ of the keying color $C_k$ corresponding to channel H is determined. Then, an error between $H_f$ and $H_k$ (corresponding to the foregoing background color cast) between is calculated according to the following formula (4):

$$d_f = \begin{cases} H_f - H_k - 360, & (H_f - H_k) > 180 \\ H_f - H_k, & -180 \leq (H_f - H_k) \leq 180, \\ H_f - H_k + 360, & (H_f - H_k) < -180 \end{cases} \quad (4)$$

where $d_f$ represents the error between $H_f$ and $H_k$, 180 refers to 180 degrees in hue circle (hue cycle), and 360 refers to 360 degrees.

Step (b): Update a value of $H_f$ according to a function $G(H_f)$ shown in the following formula (5):

$$G(H_f) = \begin{cases} H_k - \dfrac{T_3}{2}, & -T_3 < d_f \leq 0 \\ H_f, & d_f \leq -T_3 \text{ or } d_f \geq T_3, \\ H_k + \dfrac{T_3}{2}, & 0 < d_f < T_3 \end{cases} \quad (5)$$

where the situation of "$d_f \leq -T_3$ or $d_f \geq T_3$" corresponds to the foregoing situation that the background color cast reaches the a set degree of color cast, so that the hue of the pixel is kept unchanged. The situations of "$-T_3 < d_f \leq 0$" and "$0 < d_f < T_3$" correspond to the foregoing situation that the background color cast does not reach the a set degree of color cast, so that the hue of the pixel is updated. In addition, $T_3$ represents a color cast threshold. A value of $T_3$ is less than $\pi$. For example, $T_3$ may be set to $$\dfrac{\pi}{16}.$$

Step 6 is an optional shadow detail optimization step, and may be implemented by steps (1) and (2).

Step (1): Determine a shadow compensation intensity (also referred to as a shadow and highlight compensation intensity) based on luminance. For example, the foreground image $I_f$ and the keying color $C_k$ may be converted to a same color space. The color space is a YUV color space, for example. Certainly, another color space may be used here. For each pixel in the foreground image $I_f$, a channel value $Y_f$ of the pixel corresponding to a luminance channel (i.e., channel Y) is determined. Meanwhile, a channel value $Y_k$ of the keying color $C_k$ corresponding to channel Y is determined. Then, the shadow compensation intensity of the pixel may be calculated according to the following formula (6):

$$Y_c = \begin{cases} -1, & [m \cdot (Y_f - Y_k)] < -1 \\ m \cdot (Y_f - Y_k), & -1 \le [m \cdot (Y_f - Y_k)] \le 1, \\ 1, & [m \cdot (Y_f - Y_k)] > 1 \end{cases} \quad (6)$$

where $Y_c$ represents the shadow compensation intensity of the pixel, $Y_f - Y_k$ corresponds to the foregoing luminance difference, and [−1, 1] represents the foregoing intensity range. m corresponds to the foregoing shadow compensation parameter, and if this value is larger, it indicates that the shadow compensation intensity is higher. For example, this value may be set to 1.0. When m is set to 0.0, it is equivalent to skipping a shadow compensation process.

Step (2): Perform a shadow compensation process on the luminance and blending transparency of the pixel according to the shadow compensation intensity of the pixel, referring to the following formula (7):

$$A(Y_f) = \text{clip}\left(Y_f + \frac{1-\alpha}{e+\alpha} \cdot Y_c\right) \quad (7)$$
$$B(\alpha) = \text{clip}((1-\alpha) \cdot |Y_c| + \alpha)$$
$$\text{clip}(x) = \begin{cases} 0, & x < 0 \\ x, & 0 \le x \le 1 \\ 1, & 1 < x \end{cases}$$

where $A(Y_f)$ represents a function for updating the luminance $Y_f$ of the pixel, $B(\alpha)$ represents a function for updating the blending transparency $\alpha$ of the pixel, and clip(x) represents a staircase function. x in clip(x) is of no practical significance and only for reference. In addition, e is a parameter set to avoid a numeric overflow, which may be set to, for example, 0.01. In the foregoing formula, both the luminance range and the transparency range are [0, 1].

Step 7: Output the foreground image $I_f$ and the transparency channel image a.

After the first step is completed, namely the foreground image $I_f$ and the transparency channel image a are obtained, the second step, i.e., an image blending process, may be performed. For example, a composite image (also referred to as a composite resulting image) may be obtained according to the following formula (8):

$$I_o = (1-\alpha) \cdot I_b + \alpha \cdot I_f \quad (8)$$

where $I_b$ represents a background image, and may be set as required in a specific application scene, and $I_o$ represents the composite image. When the image blending process is performed according to the foregoing formula, a weighted summation process may be performed in pixels. Step 6 for shadow optimization may also be performed after the composite image is obtained.

Figure 8:
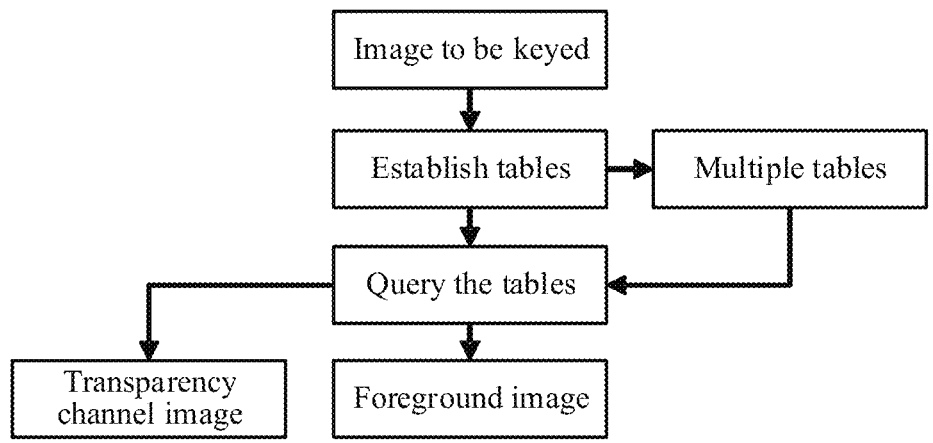
FIG. 8 is a schematic flowchart of table lookup acceleration according to an embodiment of this application.

In one embodiment, table lookup acceleration may be performed on the foregoing first step, to improve the image processing efficiency. As an example, one embodiment provides a schematic diagram of table lookup acceleration, as shown in FIG. 8. Descriptions will be made with steps in combination with FIG. 8.

Step 1: Set a keying color $C_k$.

Step 2: Establish a two-dimensional table $t_1(U_f, V_f)$ for obtaining a blending transparency by table lookup. The two-dimensional $t_1(U_f, V_f)$ corresponds to the foregoing blending transparency table. The definition of $U_f$ is the same as $U_i$. The same is true to $V_f$. Value ranges of both $U_f$ and $V_f$ are integral [0, P], where P is a result obtained by subtracting 1 from 2 to the power of number of image bits, the number of image bits being the number of bits of the image to be keyed I. For example, when the image to be keyed I is an 8-bit image, P is valued to $2^8 - 1 = 255$.

An enumeration process may be performed on $U_f$ and $V_f$ according to the value ranges of $U_f$ and $V_f$ to obtain 256×256=65536 combinations, each of which includes a $U_f$ and a $V_f$. For each combination obtained by the enumeration process, a blending transparency is determined according to the following formulas (9) and (10) and stored in the two-dimensional table $t_1(U_f, V_f)$:

$$t_1(U_f, V_f) = \frac{f((U_f - U_k)^2 + (V_f - V_k)^2)}{P^2}, \text{ and} \quad (9)$$

$$f(\alpha) = \begin{cases} P, & T_2 \le \alpha \\ P \cdot \frac{\alpha - T_1}{T_2 - T_1}, & T_1 \le \alpha < T_2. \\ 0, & \alpha < T_1 \end{cases} \quad (10)$$

The operations in the foregoing formulas may be floating-point operations.

For each combination obtained by the enumeration process, a serial number of the combination may be determined according to $U_f$ and $V_f$ in the combination. For example, the serial number q of the combination may be obtained by concatenation taking $U_f$ as a higher bit and $V_f$ as a lower bit. After a blending transparency corresponding to the combination whose serial number is q is calculated, the blending transparency may be stored at a position corresponding to a subscript of q in the two-dimensional table $t_1(U_f, V_f)$, such that the corresponding blending transparency may be queried according to the subscript. That is, a dimension of the table refers to a dimension of the subscript, and the subscript is equivalent to the foregoing index. The same is true to the following table establishment process.

Step 3: Establish a three-dimensional table $t_u(\alpha, U_f, V_f)$ for obtaining a channel value of a pixel in a foreground image $I_f$ corresponding to channel U by table lookup, and establish a three-dimensional table $t_v(\alpha, U_f, V_f)$ for obtaining a channel value of the pixel in the foreground image $I_f$ corresponding to channel V by table lookup, both the three-dimensional tables $t_u(\alpha, U_f, V_f)$ and $t_v(\alpha, U_f, V_f)$ corresponding to the foregoing updated chroma table. For each combination obtained by the enumeration process (the combination here includes $\alpha$, $U_f$, and $V_f$, where a represents a blending transparency of a pixel), steps (1) to (5) are performed.

Step (1): Update values of $U_f$ and $V_f$ by use of a function similar to $S(I_f)$, as shown in the following formula (11):

$$S(x) = \frac{(P - \alpha) \cdot I_{gray} + \alpha \cdot x}{P}, \quad (11)$$

where $I_{gray}$ corresponds to $C_{gray}$, which may be set to, for example, gray, namely a channel value of each channel in an RGB color space is 128. In S(x), x represents a pixel represented by $U_f$ and $V_f$ in the combination.

Step (2): Convert pixel x to an HSV or HSL color space to determine a channel value $H_x$ of pixel x corresponding to channel H, and simultaneously convert the keying color $C_k$ to the HSV or HSL color space to determine a channel value $H_k$ of the keying color $C_k$ corresponding to channel H.

Step (3): Determine an error $d_x$ between $H_x$ and $H_k$ according to the following formula (12):

$$d_x = \begin{cases} H_x - H_k - 360, & (H_x - H_k) > 180 \\ H_x - H_k, & -180 \leq (H_x - H_k) \leq 180 \\ H_x - H_k + 360, & (H_x - H_k) < -180 \end{cases} \quad (12)$$

Step (4): Update a value of $H_x$ according to the following formula (13):

$$G(H_x) = \begin{cases} H_k - \frac{T_3}{2}, & -T_3 < d_x \leq 0 \\ H_x, & d_x \leq -T_3 \text{ or } d_x \geq T_3 \\ H_k + \frac{T_3}{2}, & 0 < d_x < T_3 \end{cases} \quad (13)$$

where $T_3$ is greater than 0 and less than π.

Step (5): Convert pixel x to a YUV color space, store a channel value of pixel x corresponding to channel U to the three-dimensional table $t_u(\alpha, U_f, V_f)$, and simultaneously store a channel value of pixel x corresponding to channel V to the three-dimensional table $t_v(\alpha, U_f, V_f)$.

Step 4: Establish a two-dimensional table $t_y(\alpha, Y_f)$ for obtaining a channel value of the pixel in the foreground image $I_f$ corresponding to channel Y by table lookup, and establish a two-dimensional table $t_a(\alpha, Y_f)$ for obtaining a blending transparency of the pixel in the foreground image $I_f$ by table lookup, the two-dimensional table $t_y(\alpha, Y_f)$ corresponding to the foregoing compensation luminance table, and the two-dimensional table $t_a(\alpha, Y_f)$ corresponding to the foregoing compensated blending transparency table. For each combination obtained by the enumeration process (the combination here includes a and $Y_f$, where a represents a blending transparency of a pixel), steps (1) to (3) are performed.

Step (1): Determine a shadow compensation intensity according to the following formula (14):

$$Y_c = \begin{cases} -P, & [m \cdot (Y_f - Y_k)] < -P \\ m \cdot (Y_f - Y_k), & -P \leq [m \cdot (Y_f - Y_k)] \leq P \\ P, & [m \cdot (Y_f - Y_k)] > P \end{cases} \quad (14)$$

Step (2): Perform a shadow compensation process on the luminance $Y_f$ and the blending transparency α for updating, referring to the following formula (15):

$$A(Y_f) = \text{clip}\left(Y_f + \frac{P - \alpha}{e + \alpha} \cdot Y_c\right) \quad (15)$$

$$B(\alpha) = \text{clip}\left(\left(\frac{P - \alpha}{P}\right) \cdot |Y_c| + \frac{\alpha}{P}\right).$$

$$\text{clip}(x) = \begin{cases} 0, & x < 0 \\ x, & 0 \leq x \leq P \\ P, & P < x \end{cases}$$

Step (3): Store updated $Y_f$ to the two-dimensional table $t_y(\alpha, Y_e)$, and simultaneously store an updated blending transparency α to the two-dimensional table $t_\alpha(\alpha, Y_e)$.

Step 5: Process an image to be keyed I by, for example, steps (1) to (4).

Step (1): Convert the image to be keyed I to a YUV color space to obtain the foreground image $I_f$.

Step (2): Perform, for each pixel in the foreground image $I_f$, the following processes: determining a subscript according to a channel value of the pixel corresponding to channel U and a channel value corresponding to channel V, and performing a query process in the two-dimensional table $t_1$ ($U_f$, $V_f$) according to the subscript to obtain a blending transparency α of the pixel.

Step (3): Perform, for each pixel in the foreground image $I_f$, the following processes: determining a subscript according to the blending transparency α of the pixel, the channel value corresponding to channel U, and the channel value corresponding to channel V, performing a query process in the three-dimensional table $t_u$ (α, $U_f$, $V_f$) according to the subscript, and updating the channel value of the pixel corresponding to channel U to a value found from the three-dimensional table $t_u$ (α, $U_f$, $V_f$); and simultaneously performing a query process in the three-dimensional table $t_v(\alpha, U_f, V_f)$ according to the subscript, and updating the channel value of the pixel corresponding to channel V to a value found from the three-dimensional table $t_v(\alpha, U_f, V_f)$.

Step (4): Perform, for each pixel in the foreground image $I_f$, the following processes: determining a subscript according to the blending transparency α of the pixel and the channel value corresponding to channel V, performing a query process in the two-dimensional table $t_y(\alpha, Y_f)$ according to the subscript, and updating the channel value of the pixel corresponding to channel V to a value found from the two-dimensional table $t_y(\alpha, Y_f)$; and simultaneously performing a query process in the two-dimensional table $t_a(\alpha, Y_f)$ according to the subscript, and updating the blending transparency α of the pixel to a value found from the two-dimensional table $t_a(\alpha, Y_f)$.

Step 6: Output the foreground image $I_f$ and the transparency channel image.

In the foregoing table lookup acceleration method, the corresponding tables are calculated and established in advance, and when the image to be keyed needs to be processed, the tables are directly queried, so that frequent conversion to color spaces is avoided, and the image processing efficiency may be improved effectively while reducing the real-time computing load. It is proved by experiments that, with table lookup acceleration, real-time image processing may be implemented with only one core of a central processing unit (CPU), such as one core of Intel E5 v4, and in addition, the memory occupation is low, only at the level of several tens of megabytes (MB). Therefore, the image processing solution provided in the embodiments of this application may be deployed in not only a server and a computer but also a mobile terminal (for example, a mobile terminal device).

An structure of an artificial intelligence-based image processing apparatus 455 implemented as software modules in the embodiments of this application will then be described. In some embodiments, as shown in FIG. 2, the artificial-intelligence-based image processing apparatus 455 stored in a memory 450 may include the following software modules: a background color determining module 4551, configured to determine a background color in an image to be processed; a transparency determining module 4552, configured to determine, according to a chroma difference between a pixel in the image to be processed and the background color, a blending transparency of the pixel; an image obtaining module 4553, configured to obtain a background image corresponding to the image to be processed; and an image blending module 4554, configured to perform in pixels an image blending process on the image to be processed and the background image according to the blending transparency of the pixel in the image to be processed to obtain a composite image.

In some embodiments, the artificial-intelligence-based image processing apparatus 455 further includes a color optimization module, configured to perform in pixels a blending process on the image to be processed and an alternative color according to the blending transparency of the pixel in the image to be processed to obtain a foreground image. The image blending module 4554 is further configured to perform in pixels an image blending process on the foreground image and the background image according to a blending transparency of a pixel in the foreground image.

In some embodiments, the color optimization module is further configured to: determine, according to a chroma difference between the pixel in the foreground image and the background color, a background color cast of the pixel; keep the chroma of the pixel unchanged when the background color cast of the pixel reaches a set degree of color cast; and perform, when the background color cast of the pixel does not reach the a set degree of color cast, a shifting process on chroma of the background color to obtain shifted chroma, and update the chroma of the pixel to the shifted chroma.

In some embodiments, the artificial-intelligence-based image processing apparatus 455 further includes a shadow optimization module, configured to determine a luminance difference between the pixel in the image to be processed and the background color, perform a weighting process on the luminance difference according to a shadow compensation parameter to obtain a shadow compensation intensity of the pixel, and perform a shadow compensation process on luminance and blending transparency of the pixel according to the shadow compensation intensity of the pixel.

In some embodiments, the shadow optimization module is further configured to: perform a restriction process on the shadow compensation intensity of the pixel according to an intensity range; perform a luminance increase process on the pixel according to the shadow compensation intensity, luminance, and blending transparency of the pixel, and perform, according to a luminance range, a restriction process on luminance obtained by the luminance increase process; and perform a blending transparency increase process on the pixel according to the shadow compensation intensity and blending transparency of the pixel, and perform, according to a transparency range, a restriction process on a blending transparency obtained by the blending transparency increase process.

In some embodiments, the intensity range includes a minimum intensity and a maximum intensity. The shadow optimization module is further configured to update the shadow compensation intensity to the minimum intensity when the shadow compensation intensity is less than the minimum intensity, keep the shadow compensation intensity unchanged when the shadow compensation intensity is within the intensity range, and update the shadow compensation intensity to the maximum intensity when the shadow compensation intensity is greater than the minimum intensity.

In some embodiments, the artificial-intelligence-based image processing apparatus 455 further includes a stretching module, configured to obtain the transparency range, the transparency range including a minimum transparency and a maximum transparency, and perform a stretching process on the blending transparency of the pixel according to the transparency range to obtain a new blending transparency of each pixel, the new blending transparencies of at least part of pixels in the image to be processed being the minimum transparency, and the new blending transparencies of at least part of remaining pixels being the maximum transparency.

In some embodiments, the stretching module is further configured to: determine the minimum transparency as the new blending transparency when the blending transparency is less than a first transparency threshold; determine, when the blending transparency is greater than or equal to the first transparency threshold and less than a second transparency threshold, an intermediate transparency according to the blending transparency, the first transparency threshold, and the second transparency threshold, and determine the intermediate transparency as the new blending transparency; and determine the maximum transparency as the new blending transparency when the blending transparency is greater than or equal to the second transparency threshold, the first transparency threshold being less than the second transparency threshold, and the first transparency threshold, the second transparency threshold, and the intermediate transparency being all within the transparency range.

In some embodiments, the transparency determining module 4552 is further configured to: convert the image to be processed and the background color into a same color space, the color space including multiple chroma channels; determine, for each chroma channel, a difference between a channel value of the pixel in the image to be processed corresponding to the chroma channel and a channel value of the background color corresponding to the chroma channel, and determine the determined difference as a chroma difference corresponding to the chroma channel; and perform a difference blending process on the multiple chroma differences in one-to-one correspondence to the multiple chroma channels to obtain the blending transparency of the pixel.

In some embodiments, the image blending module 4554 is further configured to: convert the image to be processed and the background image into a same color space, the color space including multiple channels; and perform the following processes for each channel: determining a first channel value of a first pixel in the image to be processed corresponding to the channel and a second channel value of a second pixel in the background image corresponding to the channel; and performing a weighting process on the first channel value and the second channel value according to a blending transparency of the first pixel to obtain a third channel value of a third pixel in the composite image corresponding to the channel, a pixel position of the first pixel, a pixel position of the second pixel, and a pixel position of the third pixel being in a mapping relationship.

In some embodiments, the artificial-intelligence-based image processing apparatus 455 further includes a table establishment module, configured to perform an enumeration process according to a chroma range to obtain multiple pieces of chroma, determine a blending transparency corresponding to each piece of chroma according to a chroma difference between each piece of chroma and the chroma of the background color, and establish a blending transparency table according to the multiple pieces of chroma and the multiple blending transparencies in one-to-one correspondence to the multiple pieces of chroma. The transparency determining module 4552 is further configured to perform a query process in the blending transparency table according to the chroma of the pixel in the image to be processed, and determine a found blending transparency as the blending transparency of the pixel.

In some embodiments, the background color determining module 4551 is further configured to perform any one of the following processes: obtaining a background color set for the image to be processed as the background color of the image to be processed; and performing a target recognition process on the image to be processed to obtain a target region, and determining a color corresponding to a maximum frequency of occurrence in a background region of the image to be processed as the background color of the image to be processed, the background region being a region different from the target region in the image to be processed.

The artificial-intelligence-based image processing apparatus provided in one embodiment may at least have the following technical effects. 1) Edge details in the image to be processed may be retained during image processing to implement hair-level keying and improve the image processing accuracy. 2) A shadow/highlight in the background region in the image to be processed may be retained to ensure a more realistic shadow/highlight effect in the composite image obtained by performing the image blending process with the background image. 3) High-quality keying may be performed for a semitransparent object (for example, a glass), to ensure accurate presentation of the semitransparent object in the composite image. 4) The situation that the foreground is biased to the background color (the person is greenish) in the composite image may be avoided effectively, and the visual effect may be improved.

An embodiment of this application provides a computer program product or a computer program. The computer program product or the computer program includes computer instructions (executable instructions), and the computer instructions are stored in a computer-readable storage medium. A processor of an electronic device reads the computer instructions from the computer-readable storage medium and executes the computer instructions to cause the electronic device to perform the foregoing artificial-intelligence-based image processing method of the embodiments of this application.

An embodiment of this application provides a computer-readable storage medium storing executable instructions. The executable instructions, when executed by a processor, cause the processor to perform the method provided in the embodiments of this application, for example, the artificial-intelligence-based image processing method shown in FIG. 3A, FIG. 3B, FIG. 3C, FIG. 3D, and FIG. 3E.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM; or may be any device including one of or any combination of the foregoing memories.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in the plurality of collaborative files (for example, be stored in files of one or modules, subprograms, or code parts).

In an example, the executable instructions can be deployed for execution on one electronic device, execution on a plurality of electronic devices located at one location, or execution on a plurality of electronic devices that are distributed at a plurality of locations and that are interconnected through a communication network.

The foregoing descriptions are merely embodiments of this application and are not intended to limit the protection scope of this application. Any modification, equivalent replacement, or improvement made without departing from the spirit and range of this application shall fall within the protection scope of this application.

What is claimed is:

1. An image processing method, performed by an electronic device, the method comprising:
   determining a background color in an image to be processed;
   for each of a plurality of pixels in the image to be processed:
      determining, according to a chroma difference between the pixel and the background color, a blending transparency of the pixel;
      determining a luminance difference between the pixel and the background color in the image to be processed;
      performing a weighting process on the luminance difference according to a shadow compensation parameter to obtain a shadow compensation intensity of the pixel; and
      performing a shadow compensation process on the blending transparency of the pixel according to the shadow compensation intensity of the pixel, comprising: increasing the blending transparency of the pixel according to the shadow compensation intensity, to obtain an increased blending transparency, and restricting the increased blending transparency according to a transparency range;
   obtaining a background image corresponding to the image to be processed, wherein the background image is different from the image to be processed and is determined based on an application scenario; and
   performing, in a pixel-by-pixel manner, an image blending process on the image to be processed and the background image according to the blending transparency of the pixel to obtain a composite image.

2. The method according to claim 1, further comprising:
for each of a plurality of pixels in the image to be processed:
   performing a blending process on the image to be processed and an alternative color according to the blending transparency of the pixel to obtain a foreground image, wherein
   the performing an image blending process on the image to be processed and the background image according to the blending transparency of the pixel in the image to be processed comprises:
      performing an image blending process on the foreground image and the background image according to a blending transparency of the pixel.

3. The method according to claim 2, further comprising:
   determining a background color cast of the pixel according to a chroma difference between the pixel in the foreground image and the background color;
   keeping chroma of the pixel unchanged when the background color cast of the pixel reaches a degree of color cast; and
   performing a shifting process on chroma of the background color to obtain shifted chroma, and updating the chroma of the pixel to the shifted chroma when the background color cast of the pixel does not reach the degree of color cast.

4. The method according to claim 1,
wherein the performing the shadow compensation process further comprises:
increasing luminance on the pixel according to the shadow compensation intensity, luminance of the pixel, and the blending transparency of the pixel, to obtain an increased luminance; and
restricting the increased luminance according to a luminance range.

5. The method according to claim 1, further comprising:
obtaining the transparency range, the transparency range comprising a minimum transparency and a maximum transparency; and
performing a stretching process on the blending transparency of the pixel according to the transparency range to obtain a new blending transparency of each pixel, the new blending transparencies of at least part of pixels in the image to be processed being the minimum transparency, and the new blending transparencies of at least part of remaining pixels being the maximum transparency.

6. The method according to claim 5, wherein the performing a stretching process on the blending transparency of the pixel according to the transparency range comprises:
determining the minimum transparency as the new blending transparency when the blending transparency is less than a first transparency threshold;
determining, when the blending transparency is greater than or equal to the first transparency threshold and less than a second transparency threshold, an intermediate transparency according to the blending transparency, the first transparency threshold, and the second transparency threshold, and determining the intermediate transparency as the new blending transparency; and
determining the maximum transparency as the new blending transparency when the blending transparency is greater than or equal to the second transparency threshold,
the first transparency threshold being less than the second transparency threshold, and the first transparency threshold, the second transparency threshold, and the intermediate transparency being all within the transparency range.

7. The method according to claim 1, wherein the determining a blending transparency of the pixel according to a chroma difference between a pixel in the image to be processed and the background color comprises:
converting the image to be processed and the background color into a same color space, the color space comprising multiple chroma channels;
determining, for each chroma channel, a difference between a channel value of the pixel in the image to be processed corresponding to the chroma channel and a channel value of the background color corresponding to the chroma channel, and determining the determined difference as a chroma difference corresponding to the chroma channel; and
performing a difference blending process on the multiple chroma differences in one-to-one correspondence to the multiple chroma channels to obtain the blending transparency of the pixel.

8. The method according to claim 1, wherein the performing an image blending process on the image to be processed and the background image according to the blending transparency of the pixel in the image to be processed to obtain a composite image comprises:
converting the image to be processed and the background image into a same color space, the color space comprising multiple channels;
performing the following processes for each channel:
determining a first channel value of a first pixel in the image to be processed corresponding to the channel and a second channel value of a second pixel in the background image corresponding to the channel; and
performing a weighting process on the first channel value and the second channel value according to a blending transparency of the first pixel to obtain a third channel value of a third pixel in the composite image corresponding to the channel,
a pixel position of the first pixel, a pixel position of the second pixel, and a pixel position of the third pixel being in a mapping relationship.

9. The method according to claim 1, further comprising:
performing an enumeration process according to a chroma range to obtain multiple pieces of chroma;
determining a blending transparency value corresponding to each piece of chroma according to a chroma difference between each piece of chroma and the chroma of the background color; and
establishing a blending transparency table according to the multiple pieces of chroma and the multiple blending transparency values in one-to-one correspondence to the multiple pieces of chroma, wherein
the determining blending transparency of the pixel according to a chroma difference between a pixel in the image to be processed and the background color comprises:
performing a query process in the blending transparency table according to the chroma of the pixel in the image to be processed, and determining a found blending transparency as the blending transparency of the pixel.

10. The method according to claim 1, wherein the determining a background color in an image to be processed comprises:
performing any one of the following processes:
obtaining a background color set for the image to be processed as the background color of the image to be processed; and
performing a target recognition process on the image to be processed to obtain a target region, and determining a color corresponding to a maximum frequency of occurrence in a background region of the image to be processed as the background color of the image to be processed,
the background region being a region different from the target region in the image to be processed.

11. An electronic device, comprising:
a memory, configured to store executable instructions; and
a processor, configured to, when executing the executable instructions stored in the memory, implement:
determining a background color in an image to be processed;
for each of a plurality of pixels in the image to be processed:
determining, according to a chroma difference between the pixel and the background color, a blending transparency of the pixel;
determining a luminance difference between the pixel and the background color in the image to be processed;

performing a weighting process on the luminance difference according to a shadow compensation parameter to obtain a shadow compensation intensity of the pixel; and performing a shadow compensation process on the blending transparency of the pixel according to the shadow compensation intensity of the pixel, comprising: increasing the blending transparency of the pixel according to the shadow compensation intensity, to obtain an increased blending transparency, and restricting the increased blending transparency according to a transparency range;

obtaining a background image corresponding to the image to be processed, wherein the background image is different from the image to be processed and is determined based on an application scenario; and performing, in a pixel-by-pixel manner, an image blending process on the image to be processed and the background image according to the blending transparency of the pixel to obtain a composite image.

12. The electronic device according to claim 11, wherein the processor is further configured to implement: for each of a plurality of pixels in the image to be processed:

performing a blending process on the image to be processed and an alternative color according to the blending transparency of the pixel to obtain a foreground image, wherein the performing an image blending process on the image to be processed and the background image according to the blending transparency of the pixel in the image to be processed comprises:

performing an image blending process on the foreground image and the background image according to a blending transparency of the pixel.

13. The electronic device according to claim 12, wherein the processor is further configured to implement:

determining a background color cast of the pixel according to a chroma difference between the pixel in the foreground image and the background color;

keeping chroma of the pixel unchanged when the background color cast of the pixel reaches a degree of color cast; and performing a shifting process on chroma of the background color to obtain shifted chroma, and updating the chroma of the pixel to the shifted chroma when the background color cast of the pixel does not reach the degree of color cast.

14. The electronic device according to claim 11,
wherein the performing the shadow compensation process further comprises:

increasing luminance on the pixel according to the shadow compensation intensity, luminance of the pixel, and the blending transparency of the pixel, to obtain an increased luminance; and restricting the increased luminance according to a luminance range.

15. The electronic device according to claim 11, wherein the processor is further configured to implement:

restricting the shadow compensation intensity of the pixel according to an intensity range.

16. The electronic device according to claim 15, wherein the intensity range comprises a minimum intensity and a maximum intensity; and the restricting the shadow compensation intensity of the pixel according to an intensity range comprises:

updating the shadow compensation intensity to the minimum intensity when the shadow compensation intensity is less than the minimum intensity;

keeping the shadow compensation intensity unchanged when the shadow compensation intensity is within the intensity range; and updating the shadow compensation intensity to the maximum intensity when the shadow compensation intensity is greater than the minimum intensity.

17. A non-transitory computer-readable storage medium, storing executable instructions, the executable instructions, when executed by a processor, causing the processor to implement:

determining a background color in an image to be processed;

for each of a plurality of pixels in the image to be processed:

determining, according to a chroma difference between the pixel and the background color, a blending transparency of the pixel;

determining a luminance difference between the pixel and the background color in the image to be processed;

performing a weighting process on the luminance difference according to a shadow compensation parameter to obtain a shadow compensation intensity of the pixel; and performing a shadow compensation process on the blending transparency of the pixel according to the shadow compensation intensity of the pixel, comprising: increasing the blending transparency of the pixel according to the shadow compensation intensity, to obtain an increased blending transparency, and restricting the increased blending transparency according to a transparency range;

obtaining a background image corresponding to the image to be processed, wherein the background image is different from the image to be processed and is determined based on an application scenario; and performing, in a pixel-by-pixel manner, an image blending process on the image to be processed and the background image according to the blending transparency of the pixel to obtain a composite image.

18. The computer-readable storage medium according to claim 14, wherein the executable instructions further cause the processor to implement:

obtaining the transparency range, the transparency range comprising a minimum transparency and a maximum transparency; and performing a stretching process on the blending transparency of the pixel according to the transparency range to obtain a new blending transparency of each pixel, the new blending transparencies of at least part of pixels in the image to be processed being the minimum transparency, and the new blending transparencies of at least part of remaining pixels being the maximum transparency.

19. The method according to claim 1, further comprising:
restricting the shadow compensation intensity of the pixel according to an intensity range.

20. The method according to claim 19, wherein the intensity range comprises a minimum intensity and a maximum intensity; and the restricting the shadow compensation intensity of the pixel according to an intensity range comprises:

updating the shadow compensation intensity to the minimum intensity when the shadow compensation intensity is less than the minimum intensity;
keeping the shadow compensation intensity unchanged when the shadow compensation intensity is within the intensity range; and
updating the shadow compensation intensity to the maximum intensity when the shadow compensation intensity is greater than the minimum intensity.

\* \* \* \* \*